(12) United States Patent
Gewickey et al.

(10) Patent No.: US 11,342,000 B2
(45) Date of Patent: *May 24, 2022

(54) IMMERSIVE VIRTUAL REALITY PRODUCTION AND PLAYBACK FOR STORYTELLING CONTENT

(71) Applicant: Warner Bros. Entertainment Inc., Burbank, CA (US)

(72) Inventors: Gregory I. Gewickey, Carpinteria, CA (US); Lewis S. Ostrover, Los Angeles, CA (US); Michael Smith, Santa Monica, CA (US); Michael Zink, Escondido, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,347

(22) Filed: Sep. 9, 2019

(65) Prior Publication Data

US 2020/0090702 A1 Mar. 19, 2020

Related U.S. Application Data

(60) Continuation of application No. 16/149,033, filed on Oct. 1, 2018, now Pat. No. 10,410,675, which is a
(Continued)

(51) Int. Cl.
*H04N 5/76* (2006.01)
*G11B 27/036* (2006.01)
(Continued)

(52) U.S. Cl.
CPC .......... *G11B 27/036* (2013.01); *G11B 27/031* (2013.01); *G11B 27/11* (2013.01);
(Continued)

(58) Field of Classification Search
None
See application file for complete search history.

(56) References Cited

U.S. PATENT DOCUMENTS 8,611,015 B2 12/2013 Wheeler et al.
9,997,199 B2 * 6/2018 Gewickey ............ H04N 13/344
(Continued)

FOREIGN PATENT DOCUMENTS

WO WO 2016/172557 A1 10/2016

OTHER PUBLICATIONS

Wingfield, Nick. "Next Virtual Reality: Video, Without the Games." The New York Times. Aug. 21, 2014.
(Continued)

*Primary Examiner* — Eileen M Adams
(74) *Attorney, Agent, or Firm* — One LLP

(57) ABSTRACT

Methods for digital content production and playback of an immersive stereographic video work provide or enhance interactivity of immersive entertainment using various different playback and production techniques. "Immersive stereographic" may refer to virtual reality, augmented reality, or both. The methods may be implemented using specialized equipment for immersive stereographic playback or production. Aspects of the methods may be encoded as instructions in a computer memory, executable by one or more processors of the equipment to perform the aspects.

20 Claims, 25 Drawing Sheets

Related U.S. Application Data continuation of application No. 15/717,823, filed on Sep. 27, 2017, now Pat. No. 10,109,320, which is a division of application No. 14/960,379, filed on Dec. 5, 2015, now Pat. No. 9,997,199.

(60) Provisional application No. 62/088,496, filed on Dec. 5, 2014.

(51) Int. Cl.
| | | |
|---|---|---|
| *H04N 13/117* | (2018.01) | |
| *G11B 27/031* | (2006.01) | |
| *G11B 27/11* | (2006.01) | |
| *H04N 13/388* | (2018.01) | |
| *H04N 13/344* | (2018.01) | |
| *H04N 13/25* | (2018.01) | |

(52) U.S. Cl.
CPC ............ *H04N 13/117* (2018.05); *H04N 13/25* (2018.05); *H04N 13/344* (2018.05); *H04N 13/388* (2018.05)

(56) References Cited

U.S. PATENT DOCUMENTS

| | | | |
|---|---|---|---|
| 10,276,211 B2* | 4/2019 | Gewickey | G11B 27/031 |
| 2003/0025842 A1 | 2/2003 | Saccomanno | |
| 2007/0165942 A1* | 7/2007 | Jin | H04N 13/122 382/154 |
| 2010/0149175 A1 | 6/2010 | Tan | |
| 2010/0211439 A1 | 8/2010 | Marci et al. | |
| 2013/0143584 A1* | 6/2013 | Mechaley, Jr. | H04W 4/029 455/456.1 |
| 2013/0145384 A1* | 6/2013 | Krum | G06Q 30/02 725/10 |
| 2013/0280682 A1 | 10/2013 | Levine et al. | |
| 2014/0221866 A1 | 8/2014 | Quy | |
| 2015/0318019 A1 | 11/2015 | Singhal | |
| 2017/0188013 A1* | 6/2017 | Presler | H04N 13/161 |
| 2017/0258320 A1* | 9/2017 | Abreu | A61B 3/1241 |

OTHER PUBLICATIONS

Spangler, Todd. "Netflix Hacks up 3D Virtual-Reality Demo Using Oculus Rift Video". Variety. Aug. 21, 2014.
Wikipedia. "Light-Field Camera." Retrieved from Wikepedia, the free encyclopedia website: ilttps://en_wikipedia_org/wiki/Light-field_camera. Aug. 21, 2014.
Spangler, Todd. "Google Ventures Invests in Cinematic Virtual-Reality Startup Jaunt." Variety. Aug. 21, 2014.
Savvides, Lexy. "Pelican Imaging Brings Light-Field Photos to Smartphones." CNET. Jul. 28, 2014.
Hua, Hong et al. "Correct Focus Cues in Stereoscopic Displays Improve 3D Depth Perception." Retrieved from SPIE Newsroom website: http://spie.org/newsroom/technical-articlesarchive/ 3109-correct-focus-cues-i n-stereoscopi. Jul. 29, 2010.
Steele, Billy. "Disney Research Crafts a More Realistic Way to Capture the Human Eye." Retrieved from website: http://www.engadget.com/2014/12/05/disney-research-3D-eye-capture/. Dec. 5, 2014.
Hongo, Jun. "Japan Toy Maker to Introduce 'Mind Reading' Gadget." Retrieved from Lifestyle & Culture: http:l/blogs.wsj_com/japanrealtime/2014/10/02/japan-toy-maker-to-introduce-mind-reading. Oct. 2, 2014.
Statt, Nick. "Intel's Realsense 3D Tech Offers Glimpse at Future of Mobile Cameras." CNET. Sep. 9, 2014.
Constine, Josh. "Oculus Execs Believe Controllers Are the Missing Link in Virtual Reality." Retrieved from T echCrunch: http://techcrunch.com/2014/09/20/virtual-reality-controller/?ricid=tcdaily. Sep. 4, 2014.
"Depth of (Object) Field and Depth of {Image) Focus." Retrieved from Cyberphysics: http://www.cyberphysics_co_uk/topics/medical/Eye/Depth_of_field_and_focus.him. Sep. 4, 2014.
"Real.IZ VS-1000 High-Resolution 3D Vision System." Retrieve from Odos Imaging: http://www.odos-imaging.com/products/vs-1000/ on Sep. 2, 2014.
EP, 19735809.6 Partial Supplementary Search Report, dated Nov. 4, 2021.
EP, 19736258.5 Supplementary Search Report, dated Oct. 26, 2021.
Gilroy, S. W., et al., "Exploring Passive User Interaction for Adaptive Narratives", Proceedings of the 2012 ACM international conference on Intelligent User Interfaces, 2012, Session: Designing Narratives & Theater, Lisbon, Portugal, pp. 119-128.
Katti, H., et al., "Affective video summarization and story board generation using Pupillary dilation and Eye gaze", 2011 IEEE International Symposium on Multimedia, 2011, Dana Point, CA, pp. 319-326.
Sourina, O., et al., "EEG-Based Personalized Digital Experience", International Conference on Universal Access in Human-Computer Interaction, 2011, pp. 591-599.

* cited by examiner

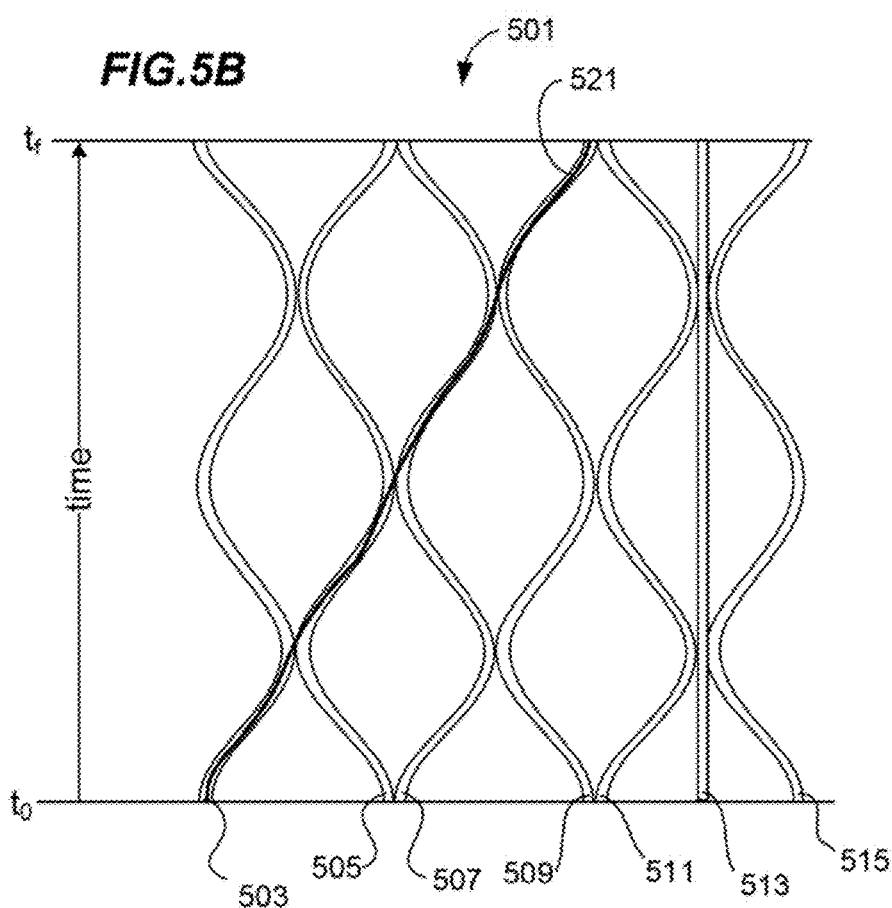
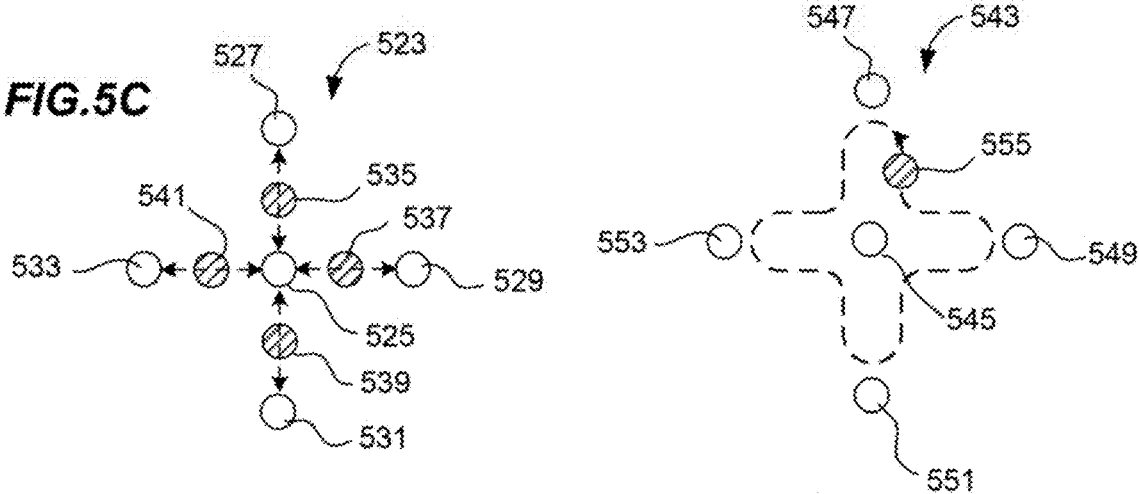

FIG.5E

FRAME SPACE TABLE 550

| | Content ID (560) | Clip ID (562) | Sequence No. (564) | Frame Type/Image Parameters (566) | Camera ID (568) | Position Coordinates (570) | Orientation Vector Coordinates (572) | Focal Length (574) | Focus Depth (576) | Aperture/Depth of Field (578) |
|---|---|---|---|---|---|---|---|---|---|---|
| FRAME (552, 554) | A | 333 | 0001 | I | B | 0,0,0 | 1.2, 1.5 | 50 mm | 3 | .1 |
| FRAME | A | 333 | 0002 | P | B | 0,0,0 | 1.2, 1.5 | 50 mm | 3 | .1 |
| FRAME | A | 333 | 0003 | P | B | 0,0,0 | 1.2, 1.5 | 50 mm | 3 | .1 |
| FRAME (556, 558) | A | 333 | 0004 | P | B | 0,0,0 | 1.2, 1.5 | 50 mm | 3 | .1 |

FIG.5F

| | RELATED FRAME SPACE (582) | CLIP(S) (584) | STORY TREE NODE (586) | RENDER CONSTRAINTS (588) | AUDIO (590) | UI SPECIFICATION (592) |
|---|---|---|---|---|---|---|
| 3D SCENE DATA | A | CID | NID | RCID | ASID | UIID |

580

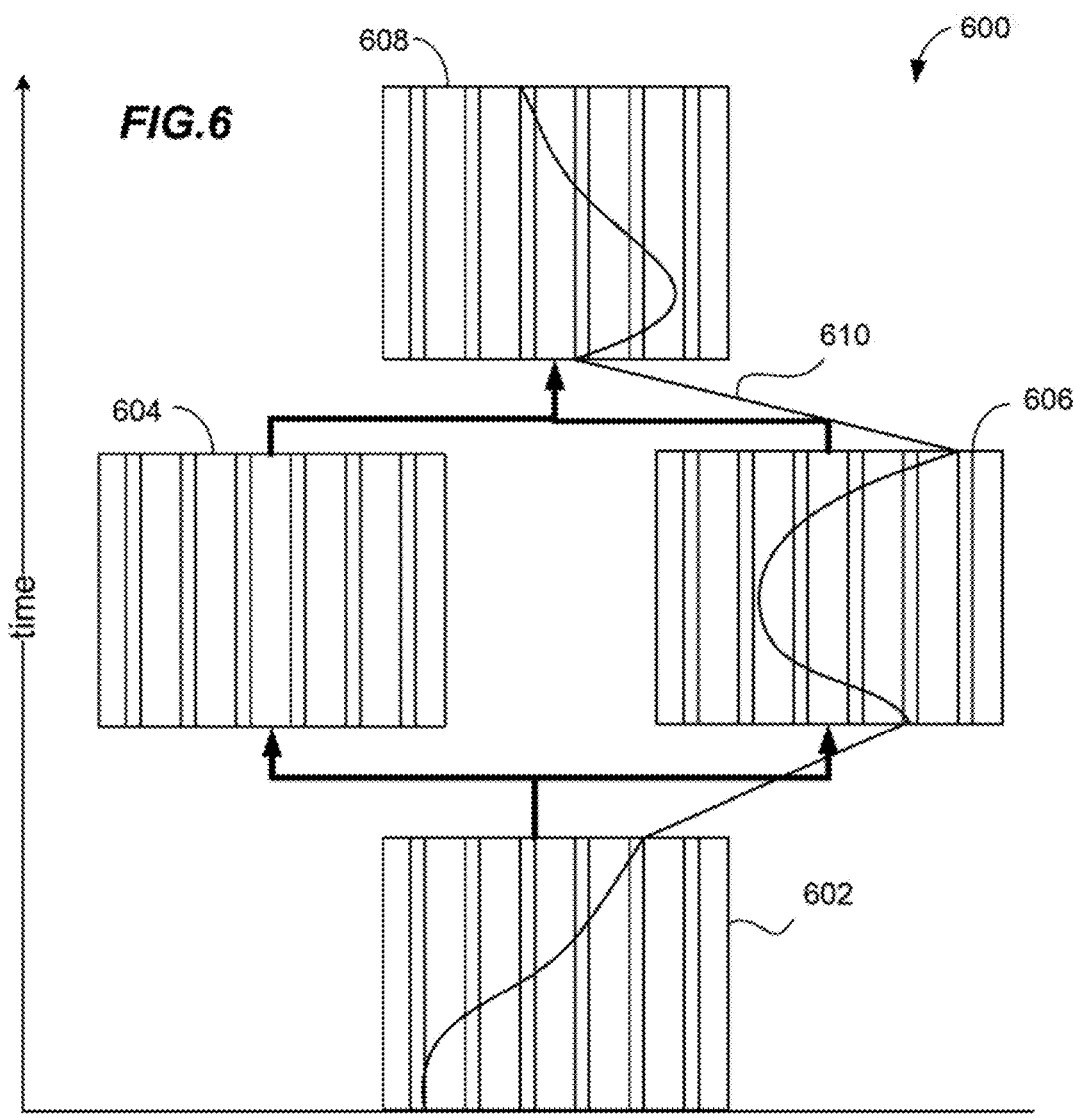
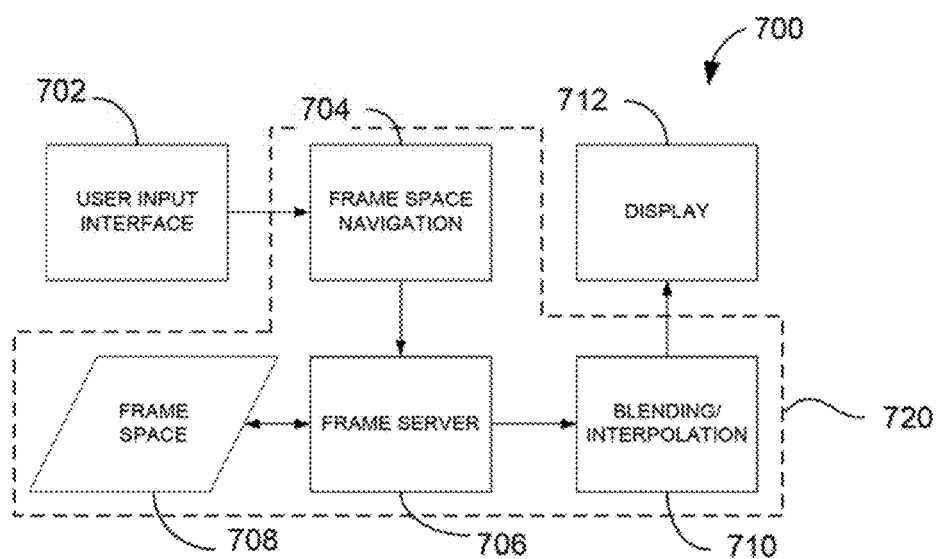

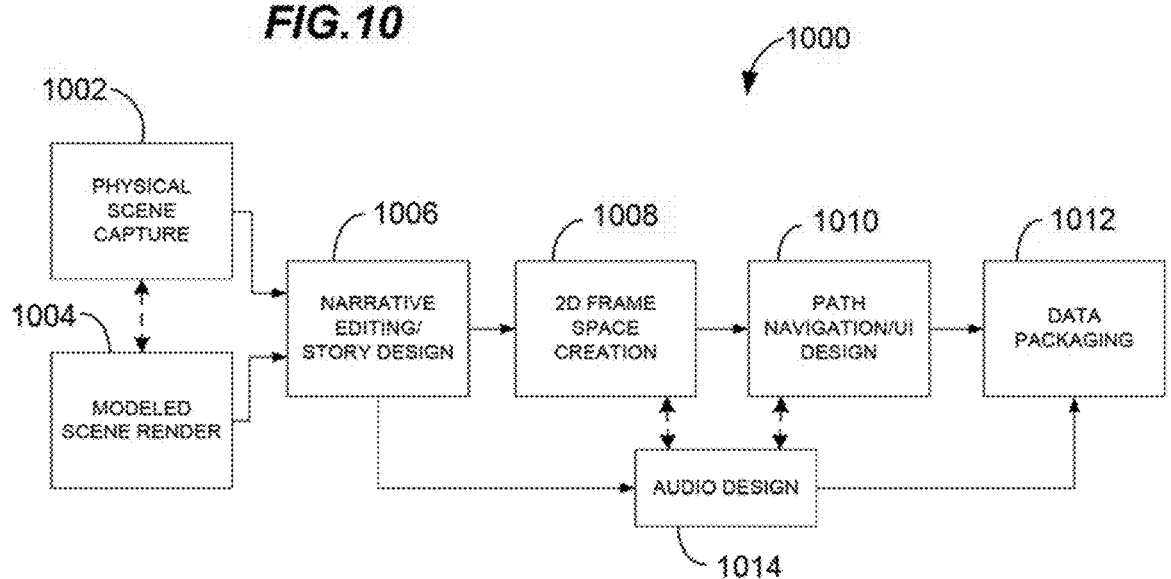
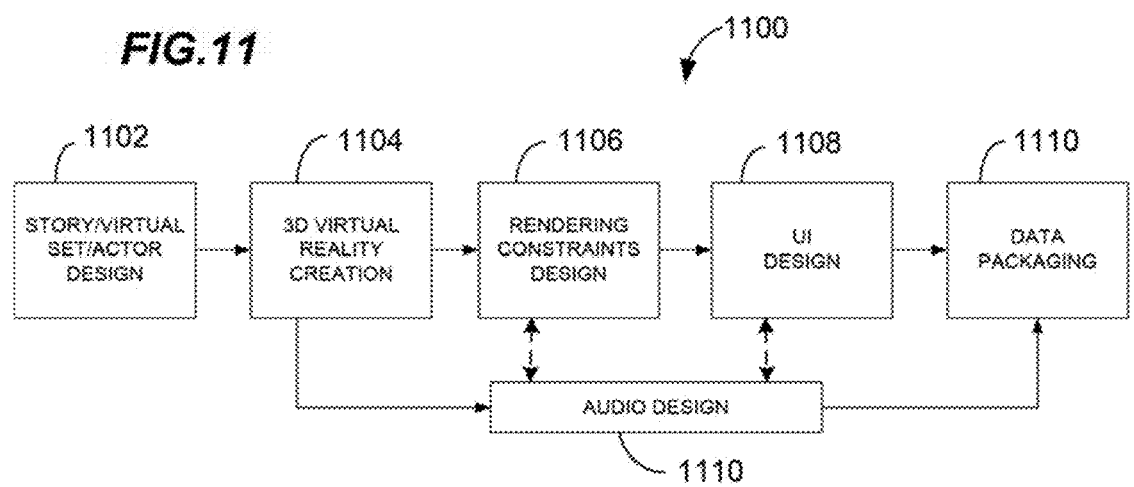
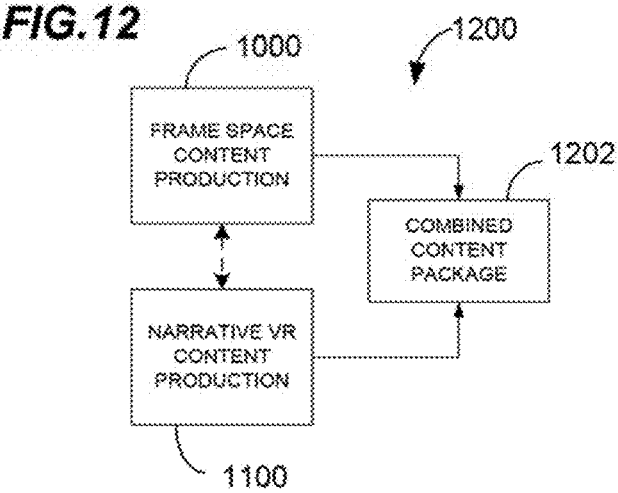

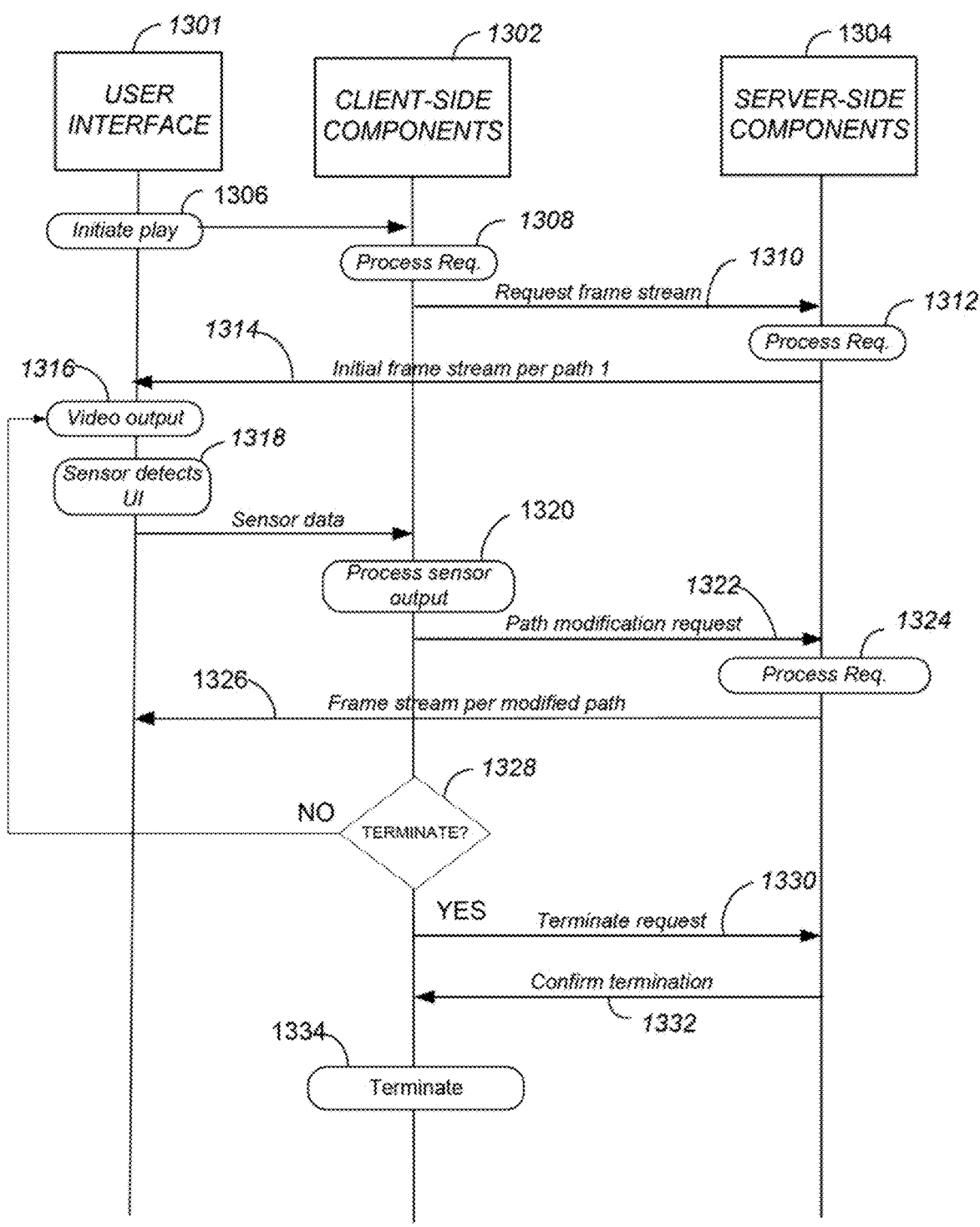

┌─ 1510
COLLECTING, IN A COMPUTER MEMORY, SENSOR DATA FROM A PLURALITY OF IMMERSIVE SG CLIENT DEVICES INDICATING AT LEAST ONE USER BIOMETRIC DURING PERFORMANCE OF A PRERECORDED ISG VIDEO WORK PLAYING ON THE IMMERSIVE SG CLIENT DEVICES

┌─ 1520
CORRELATING, USING A COMPUTER PROCESSOR, THE SENSOR DATA TO ONES OF SEGMENT IDENTIFIERS RECORDED IN A DATA STRUCTURE, EACH OF THE SEGMENT IDENTIFIERS CORRELATED TO A DIFFERENT ONE OF PRERECORDED ISG VIDEO SEGMENTS COMPRISING THE PRERECORDED ISG VIDEO WORK

┌─ 1530
DEFINING AN ALTERNATIVE STORY LINE IN THE FORM OF AN ELECTRONIC DATA FILE FOR A MODIFIED VERSION OF THE PRERECORDED VR VIDEO, BASED ON THE CORRELATING AND ON A LIBRARY OF ISG VIDEO SEGMENTS EACH ASSOCIATED WITH AN ALTERNATIVE STORY LINE BRANCH

┌─ 1540
PROVIDING THE ELECTRONIC DATA FILE TO AT LEAST ONE OF THE IMMERSIVE ISG CLIENT DEVICES FOR PLAY OF A MODIFIED VR WORK COMPRISING PRERECORDED FRAMES

FIG. 16

1600

1610 — DETERMINING A REGION OF HIGH AUDIENCE INTEREST BASED ON THE SENSOR DATA, AND INCREASING RENDERING RESOURCES ALLOCATED TO THE REGION BASED ON A MEASURE OF THE AUDIENCE INTEREST

1620 — DETERMINING THE MEASURE OF THE AUDIENCE INTEREST BASED ON THE SENSOR DATA FROM THE PLURALITY OF ISG CLIENT DEVICES WHILE IN USE BY A CORRESPONDING PLURALITY OF DIFFERENT USERS

FIG. 17

1710 — DISTRIBUTING THE PRERECORDED ISG VIDEO WORK AS PART OF A REAL-TIME RENDERED APPLICATION PACKAGE, WHEREIN PLAYING OF THE PRERECORDED VIDEO WORK IS TRIGGERED BY A USER-CONTROLLABLE EVENT DEFINED BY THE RENDERED APPLICATION

1720 — ALTERING AN AMOUNT OR TIMING THAT THE PRERECORDED ISG RENDERED APPLICATION PACKAGE, BASED ON THE SENSOR DATA

1910
PROCESSING, BY A PROCESSOR OF AN ISG CONTENT DISPLAY APPARATUS, SENSOR DATA FROM AT LEAST ONE SENSOR COUPLED TO THE PROCESSOR DURING PERFORMANCE OF AN ISG VIDEO WORK PLAYING ON THE APPARATUS FOR A USER

1920
DETERMINING, DURING THE PERFORMANCE, A VIRTUAL POSITION OF A REGION OF VISUAL FOCUS IN A VIRTUAL ENVIRONMENT DEFINED BY THE ISG VIDEO WORK, BASED ON THE SENSOR DATA

1930
CONTROLLING OUTPUT OF THE APPARATUS IN RESPONSE TO THE DETERMINING

2010
DRIVING AN AUDIO TRANSDUCER WITH A SIGNAL THAT PRODUCES A DIRECTIONAL CUE INDICATING A DIRECTION OF INTEREST FOR THE USER

2020
SELECTING THE DIRECTIONAL CUE FROM THE GROUP CONSISTING OF: SPOKEN LANGUAGE OR A SOUND FIELD CONFIGURED TO BE PERCEIVED AS ORIGINATING FROM A PARTICULAR LOCATION OF THE VIRTUAL ENVIRONMENT

FIG. 21 2100

2110
ADJUSTING AT LEAST ONE OF A DEPTH OF FOCUS OF THE REGION OF VISUAL FOCUS OR AN APPARENT FOCAL LENGTH ON A DISPLAY OF THE ISG CONTENT DISPLAY APPARATUS, BASED ON THE SENSOR DATA INDICATING THAT A REGION OF VISUAL FOCUS EXISTS

2120
ADJUSTING THE DEPTH OF FOCUS AT LEAST IN PART BY TRANSITIONING FROM A FIRST FOCUS DEPTH TO A SECOND FOCUS DEPTH, HOLDING THE SECOND FOCUS DEPTH FOR A PERIOD OF TIME, AND THEN TRANSITIONING BACK TO THE FIRST FOCUS DEPTH

2130
SHIFTING A FOCUS POINT FROM AN ORIGINAL DEPTH TOWARDS A PREDETERMINED OBJECT, HOLDING THE FOCUS POINT ON THE PREDETERMINED OBJECT FOR A PERIOD OF TIME, AND THEN SHIFTING THE FOCUS POINT TO A PREDETERMINED DEPTH

2140
CHANGING THE APPARENT FOCAL LENGTH FROM AN INITIAL LENGTH TO A SECOND LENGTH, HOLDING THE APPARENT FOCAL LENGTH AT THE SECOND LENGTH FOR A PERIOD OF TIME, AND THEN CHANGING THE APPARENT FOCAL LENGTH TO A PREDETERMINED LENGTH

2150
CONSTRUCTING AND DISPLAYING A VIDEO SEGMENT BASED ON PHOTOGRAMMETRY METADATA OF THE ISG VIDEO WORK FOR THE PREDETERMINED PERIOD, OR DISPLAYING PRERECORDED VIDEO SEGMENTS CHARACTERIZED BY AN ADJUSTED DEPTH OF FOCUS OR FOCAL LENGTH FOR THE PREDETERMINED PERIOD

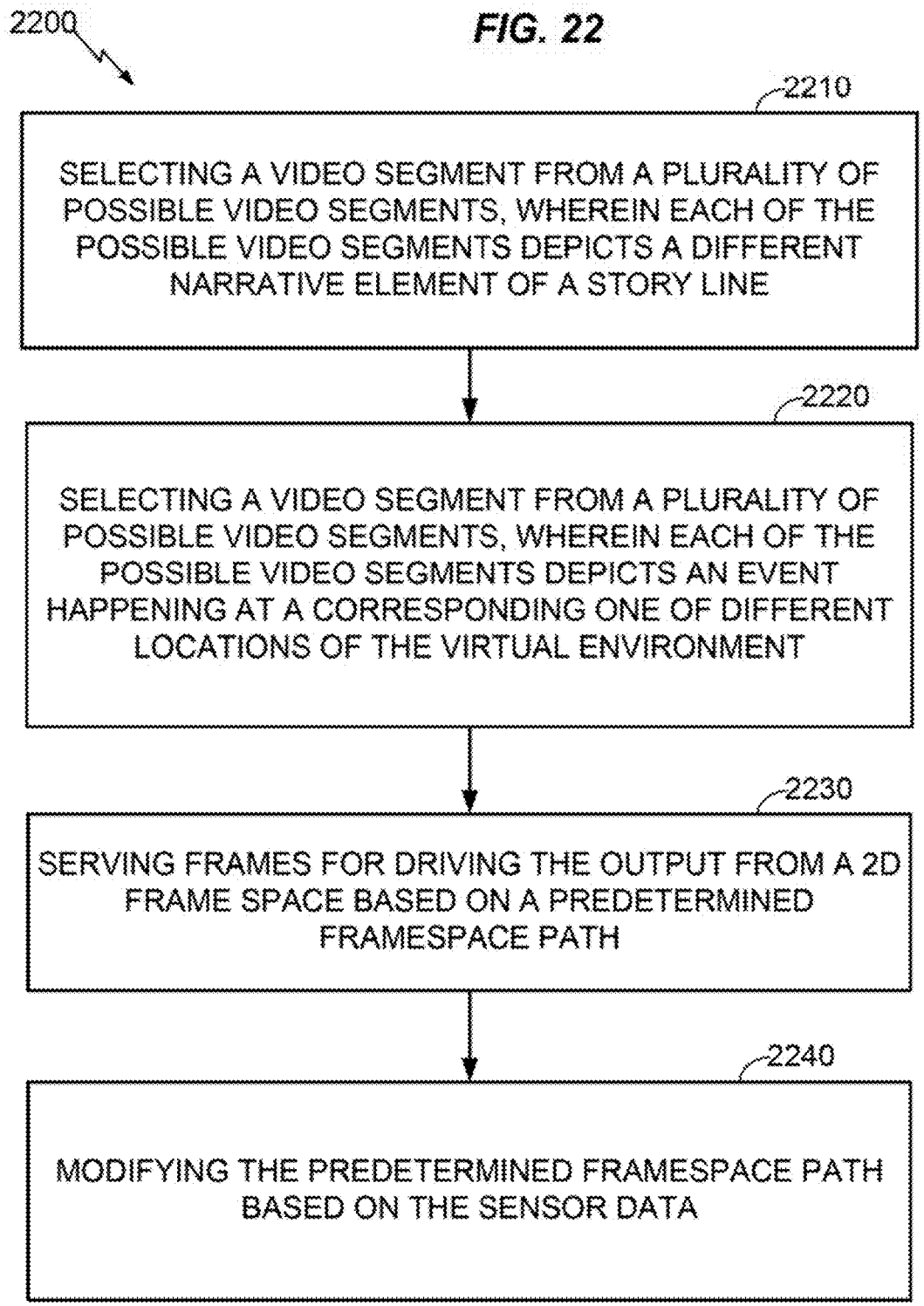

IMMERSIVE VIRTUAL REALITY PRODUCTION AND PLAYBACK FOR STORYTELLING CONTENT

CROSS-REFERENCE TO RELATED APPLICATION

This application is a continuation of U.S. patent application Ser. No. 16/149,033 filed Oct. 1, 2018, which is a continuation of U.S. patent application Ser. No. 15/717,823 filed Sep. 27, 2017, now U.S. Pat. No. 10,109,320, which is a divisional of U.S. patent application Ser. No. 14/960,379, filed Dec. 5, 2015, now U.S. Pat. No. 9,997,199, which claims priority pursuant to 35 U.S.C. § 119(e) to U.S. Provisional Patent Application Ser. No. 62/088,496, filed Dec. 5, 2014, the disclosures of which are hereby incorporated by reference, in their entireties.

FIELD

The present disclosure relates to production and playback of video content in an immersive stereographic context, for example using an immersive headset, for storytelling content.

BACKGROUND

"Virtual reality" (VR) may sometimes refer to video output of animated digital content based on three-dimensional computer models, including, for example, various video game content, and animated film content. In this type of virtual reality, in some implementations a user can navigate through a three-dimensional ("3D") environment generated based on the computer model, by controlling the position and orientation of a virtual camera that defines a viewpoint for two-dimensional ("2D") scene that is displayed on a two-dimensional display screen. In other implementations, the virtual reality may be experienced more passively, without viewer interaction that changes the scene, as when watching a movie or the like.

More recently, "virtual reality" has been applied to various types of immersive video stereographic presentation techniques including, for example, stereographic virtual reality headsets. Headsets and other presentation methods immerse the user in a 3D scene. Lenses in the headset enable to user to focus on a lightweight split display screen mounted in the headset only inches from the user's eyes. Different sides of the split display show right and left stereographic views of video content, while the user's peripheral view is blocked. Thus, the headset enables the user to perceive 3D depth in the scene and feel immersed in the displayed content. In addition, the headset includes motion sensors that detect motion of the user's head and adjust the video display accordingly. Thus, by turning his head to the side, the user can see the scene off to the side; by turning his head up or down, the user can look up or down in the scene. This responsiveness to head movement greatly enhances the immersive effect of content accessed via the headset. The user may be provided the impression of being placed inside the virtual reality scene. Virtual reality headsets may be configured as glasses, goggles, visors, or in some other form factor. Augmented reality (AR) is related to virtual reality in that it can be implemented using similar glasses or headset as used for VR. In certain implementations, AR may be used to provide an immersive, augmented experience of real-world objects by overlaying a stereographic image over a view of the surrounding physical environment.

These immersive virtual reality headsets and other immersive technologies are especially useful for game play of various types, which involve user exploration of a modelled environment generated by a rendering engine as the user controls a virtual camera using head movement and/or other inputs. Immersive VR is generally designed to accommodate non-story telling applications, for example, video games of various types. The user experience provided by immersive VR is that of being immersed in an alternative reality. To provide this experience, the user needs to perceive a freedom of movement that is in some way analogous to human visual perception when interacting with reality. Content produced for VR can provide this experience using techniques for real-time rendering that have been developed for various types of video games. The content may include a three-dimensional computer model with defined boundaries and rules, configured for rendering as video output. This content can be enhanced by stereographic techniques to provide stereographic output, sometimes referred to as "3D," and associated with a VR application that manages the rendering process in response to movement of the VR headset, to produce a resulting VR experience. The user experience is very much like being placed inside a rendered video game. A similar process can be used for AR but including a view of the user's physical environment in the immersive experience.

VR content, AR content, and video game content may also be used for storytelling, but applications to date have been limited by limitations on real-time rendering, among other things. Computer-generated stereographic animated content is well known, and often used in major motion pictures and other storytelling venues. Consumers have come to expect a very high rendering quality for such storytelling content that will not be possible to achieve by real-time rendering in the near future, if ever. Rendered content that produces realistic human actors requires a very high degree of animating skill and production effort that tends to limit this use of computer graphics to special effects. For these and other reasons, storytelling content for video game or VR environments tends to be short, simple, not of the highest rendering quality, and not the main focus of the content, which is focused on game play.

VR headsets and AR headsets have also been contemplated as an outlet for video content produced by shooting real sets, by providing production studio rendered video content, or some combination of such video content. However, the production of video content for immersive VR or AR consumption entails a completely different set of challenges and opportunities from real-time rendered content. Equipment and methods for producing VR or AR immersive content from captured or production studio rendered video content are subject to certain limitations. For example, in the absence of a computer model of the scene used for real-time rendering, it may be necessary to store and access a massive amount of video data to support a VR or AR immersive output. Such output may provide the user the experience of looking around a scene, but only from the single position from which the scene was shot, creating a "locked position" effect. For many types of video content, the ability to look all around a scene may tend to distract a user from the story that the director intends to convey, or even obstruct the relevant action, resulting in a less satisfying and focused experience for the user.

It would be desirable, therefore, to develop new hardware, production methods, output techniques, and other new technologies for video-sourced immersive VR and AR content and for use in combination with such content that overcomes these and other limitations of the prior art, and enhances enjoyment of video-captured content.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

Stereographic motion pictures and other stereographic video content have seen a revival in recent years, with advancements in the development of 3D televisions and digital projectors. The nascent technology of VR and AR immersive content may represent the next step in bringing a more immersive user experience to storytelling but entails significant technical challenges. These challenges include, for example, producing high-quality video data for VR or AR output from film or video capture of real sets and actors, or from high quality non-real-time rendering of modeled data, organizing the massive amount of video data needed to provide high-resolution VR or AR content, managing the VR and AR user interfaces and video response to user movement or other inputs, and maintaining directorial vision for storytelling content without depriving the user of a VR or AR experience. The present application discloses methods, systems and apparatus for overcoming these and other challenges encountered in the production of high-quality VR or AR content for storytelling applications. As used hereon, the phrase "immersive stereographic" may refer to VR, AR or to both.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings, in which like reference characters identify like elements correspondingly throughout the specification and drawings.

FIG. 5B is a time chart showing aspects of a latticed framespace and paths using sinusoidal frame streams, for avoiding frame interpolation.

FIGS. 5C and 5D are diagrams each illustrating a tiled portion of a different camera array including both fixed and traveling cameras.

FIG. 5E is a table illustrating dimensions of a framespace expressed as metadata.

FIG. 5F is a table illustrating aspects of coordinating 3D scene data to other narrative elements of immersive stereographic content for storytelling.

FIG. 6 is a chart illustrating aspects of narrative branching in immersive stereographic content for storytelling.

FIG. 7 is a conceptual block diagram illustrating components of a process or apparatus outputting immersive stereographic content for storytelling.

FIG. 10 is a conceptual block diagram illustrating components of a process or system for producing storytelling for immersive stereographic content.

FIG. 11 is a conceptual block diagram illustrating components of a process or system for producing real-time rendered storytelling for immersive stereographic content.

FIG. 12 is a conceptual block diagram illustrating components of a process or system for producing storytelling immersive stereographic content comprising combined pre-recorded and real-time rendered content.

FIG. 13 is a sequence diagram illustrative an example of a use case for framespace path modification in response to sensor data from an immersive VR stereographic display device.

FIGS. 15-17 are flow charts illustrating operations or aspects of method(s) for defining an alternative story line in response to audience feedback via immersive stereographic display devices.

FIGS. 19-22 are flow charts illustrating operations or aspects of method(s) for controlling output of an immersive stereographic device based on sensor data indicating a region of visual focus.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
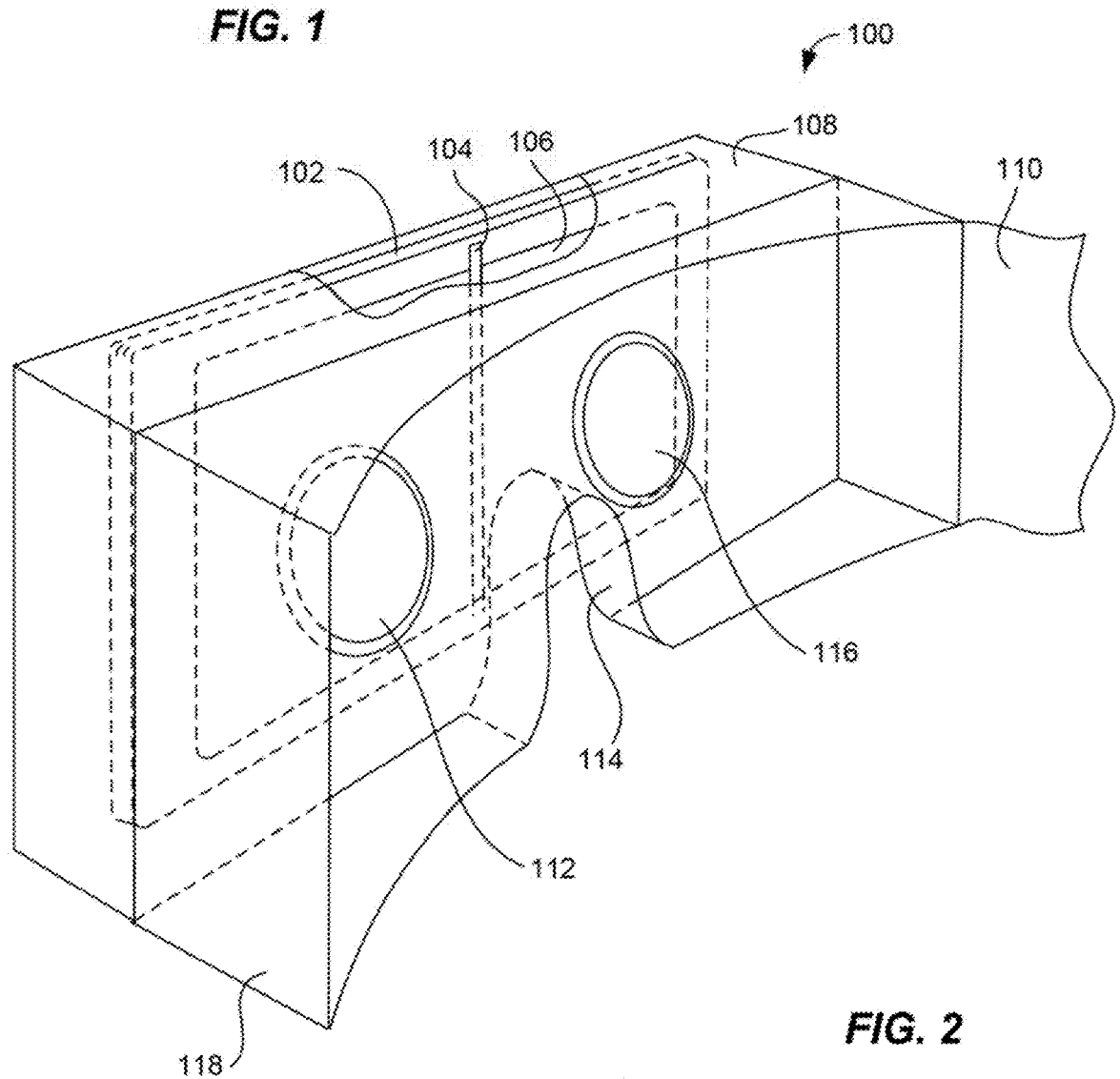
FIG. 1 is a diagram illustrating components of a stereographic display device for providing an immersive stereographic experience.

Referring to FIG. 1, an immersive stereographic display device 100 may be provided in various form factors, of which device 100 provides but one example. The innovative methods, apparatus and systems are not necessarily limited to a particular form factor of immersive display, but may be used in any immersive video output device that enables the user to control a position or point of view of video content playing on the device. The immersive stereographic display device 100 represents an example or a relatively low-cost device designed for consumer use. The same or similar device may be used for immersive VR or AR stereographic output. In VR mode, the immersive stereographic device shows only pre-recorded or computer-generated content, without revealing any of the user's immediate physical surroundings; virtual reality immerses the user in a surrogate world. In AR mode, the immersive stereographic device may combine a view of the user's surroundings captured by cameras on the head set with computer-generated content that augments the user's view of her surroundings; augmented reality augments the user's world. In addition, or in the alternative, an AR immersive stereographic output device may project or output a stereographic pair of video images on or in an essentially transparent view screen, or directly (e.g., using lasers) on the user's eyes.

The immersive stereographic display device 100 may include a tablet support structure 108 made of an opaque lightweight structural material (e.g., a rigid polymer, aluminum or cardboard) configured for supporting and allowing for removable placement of a portable tablet computing or smartphone device 102 including a high-resolution display screen 106, for example, an LCD display. This modular design may avoid the need for dedicated electronic components for video output, greatly reducing the cost. The device 100 is designed to be worn close to the user's face, enabling a wide field of view using a small screen size such as typically found in present handheld tablet computing or smartphone devices. The support structure 108 may provide a fixed mounting for a pair of lenses 112, 116 held in relation to the display screen 106. The lenses may be configured to enable the user to comfortably focus on the display screen 106 which may be held approximately one to three inches from the user's eyes.

The device 100 may further include a viewing shroud 118 coupled to the support structure 108 and configured of a soft, flexible or other suitable opaque material for form fitting to the user's face and blocking outside light. The shroud 118 may be configured to ensure that the only visible light source to the user is the display screen 106, enhancing the immersive effect of using the device 100. A screen divider 104 may be used to separate the screen 106 into independently driven stereographic regions, each of which is visible only through a corresponding one of the lenses 112, 116. Hence, the immersive stereographic display device 100 may be used to provide stereographic display output, providing a more realistic perception of 3D space for the user. It should be appreciated that aspects of the present technology may be used for, but are not necessarily limited to, stereographic video output.

The immersive stereographic display device 100 may further comprise a bridge 114 for positioning over the user's nose, to facilitate accurate positioning of the lenses 112, 116 with respect to the user's eyes. The device 100 may further comprise an elastic strap or band 110 for fitting around the user's head and holding the device 100 to the user's head.

Figure 2:
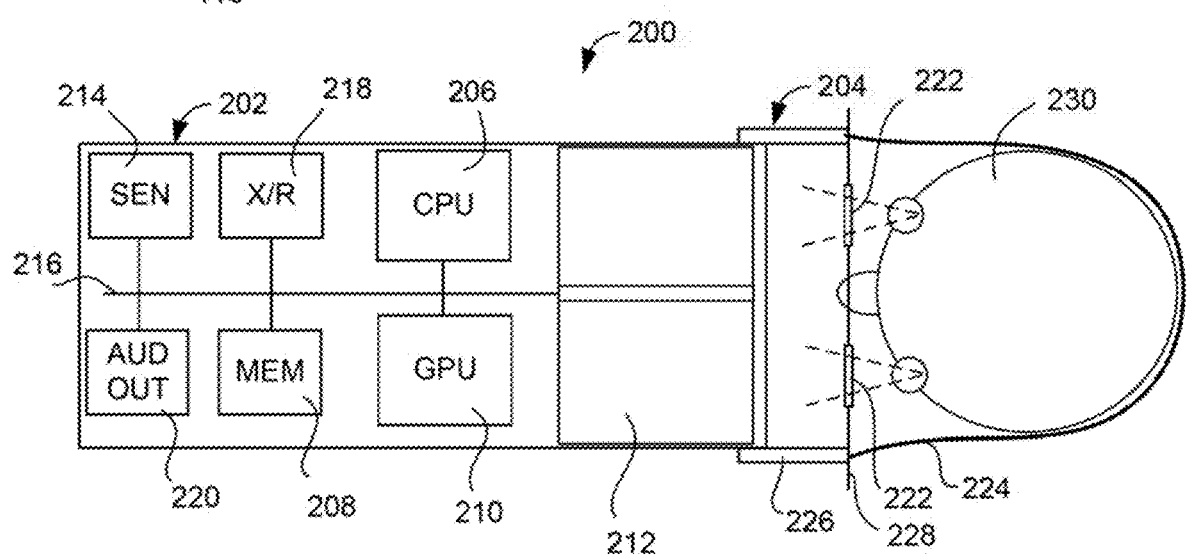
FIG. 2 is another diagram illustrating further components of the stereographic display device.

Referring to FIG. 2, a schematic diagram of an immersive stereographic (VR or AR) display device 200 that may be of the same type as device 100 shows additional electronic components of the display and communications unit 202 (e.g., a tablet computer or smartphone) in relation to a user's head 230. A support structure 204 (108, FIG. 1) holds the display and communications unit 202 using a restraining device 224 that is elastic and/or adjustable to provide a comfortable and secure snug fit, for example, adjustable headgear. When wearing the support 202, the user views the display 212 though the pair of lenses 222. The display 212 may be driven by the Central Processing Unit (CPU) 202 and/or Graphics Processing Unit (GPU) 210 via an internal bus 216. Components of the display and communications unit 202 may further include, for example, a transmit/receive component or components 218, enabling wireless communication between the CPU and an external server via a wireless coupling. The transmit/receive component 218 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 218 may enable streaming of video data to the display and communications unit 202 from a local or remote video server, and uplink transmission of sensor and other data to the local or remote video server for control or audience response techniques as described herein.

Components of the display and communications unit 202 may further include, for example, one or more sensors 214 coupled to the CPU 206 via the communications bus 216. Such sensors may include, for example, an accelerometer/inclinometer array providing orientation data for indicating an orientation of the display and communications unit 202. As the display and communications unit 202 is fixed to the user's head 230, this data may also be calibrated to indicate an orientation of the head 230. The one or more sensors 214 may further include, for example, a Global Positioning System (GPS) sensor indicating a geographic position of the user. The one or more sensors 214 may further include, for example, a camera or image sensor positioned to detect an orientation of one or more of the user's eyes. In some embodiments, a cameras, image sensor, or other sensor configured to detect a user's eyes or eye movements may be mounted in the support structure 204 and coupled to the CPU 206 via the bus 216 and a serial bus port (not shown), for example, a Universal Serial Bus (USB) or other suitable communications port. The one or more sensors 214 may further include, for example, an interferometer positioned in the support structure 204 and configured to indicate a surface contour to the user's eyes. The one or more sensors 214 may further include, for example, a microphone, array or microphones, or other audio input transducer for detecting spoken user commands or verbal and non-verbal audible reactions to display output. The one or more sensors may include, for example, electrodes to sense heart rate, a temperature sensor configured for sensing skin or body temperature of the user, or other medical sensors for collecting biofeedback data.

For immersive VR, AR or similar output modalities, the story content of a movie or the like may be enhanced, without eliminating the essence of scripted entertainment that a participant or user (who is visually, aurally and cognitively immersed) can more or less passively enjoy. For example, allowing users to move the viewpoint to see items occluded in the main view as a scene unfolds may enable such users to absorb dramatic details that enhance understanding of the plot, add emotional impact, foreshadow events to come, or otherwise enhance enjoyment of a scripted storyline. An example of the foregoing is enhancing story telling by feeding a current user-selected depth of focus into one or more feedback loops determining an interactive VR or AR narrative (or whatever form the story/presentation takes, so hereafter 'the narrative' or "story line"), and at least two sense modalities plus one cognitive item. As used herein, "depth of focus" or "focus depth" refers to distance between the camera and the focal point of an image, in which the focal depth increases as the focal point moves further from the camera.

The two sense modalities may include sight and sound. Thinking of the head-mounted display+audio examples, the user sees some field of view and hears some aurally presented sound field. The cognitive item is understanding the language, perhaps dialog or voice over or other narrative element. In each case, the narrative can influence or be influenced by the sense modalities and/or the cognition. For example, a visual event (for example, appearance of a bright light in an otherwise uniformly dim background) may occur somewhere in the far left distance of the presented visual field. This can draw the user's attention and actual visual focus. For further example, an aural event (for example, a loud sound in an otherwise uniformly low volume background) may occur somewhere in the right far distance of the presented sound field. This can also draw the user's attention and focus. For yet further example, an announcer (for example, a voice-over in a game involving an attack on a castle, which the user is inside of) may remark "The enemy is attacking over the central castle wall!" This may draw both the user's attention and visual focus, either in anticipation of the attack, or as the marauders appear at the central parapets.

In addition, or in the alternative, the participant's visual, aural or cognitive focus may influence the narrative. For example, the user focuses on the left far distance of the presented visual field—for good reasons or none—and if a biometric feedback mechanism in the head-mounted display is configured to detect the viewer's focus, an event may be caused to occur there, or nearby, or in a completely different part of the visual field if this somehow advances the narrative. For further example, the user focuses his or her aural attention some place in the sound field, perhaps craning his or her neck or otherwise signaling this aural focus, and an aural event can be caused to occur there, or nearby, or in a completely different part of the sound field if this somehow advances the narrative. For yet a further example, a user may react to some event(s) by either uttering some reflexive sound (e.g. "Oh!" or "Aha" or some such), or by actually stating or otherwise saying something (e.g. "I can see them coming over the hill," regardless of whether there actually is something to see coming over the hill), and the upshot can be that indeed something happens at the crest of the hill, or nearby, or in a completely different place if that somehow advances the narrative.

Events or visual/aural/cognitive objects of interest may coincide in many cases. Or they may not, as differences in what the visual, aural and cognitive fields present may be part of what builds tension or some other worthwhile advancement for the narrative. Sometimes dialog or a voice over may cross over from cognitive to aural stimulus, i.e. the whispered dialog may be coming from some place that attracts attention not only because of what the words mean, but simply because the sounds come from that point of origin. Still, the overriding consideration is that there are at least three types of events—visual, aural and cognitive (and blends thereof)—that can either prompt responses in the participant, or that can occur as a consequence of the participant's visual, aural and/or cognitive focus. The present application discloses technical means for accomplishing these and other forms of interactivity with VR or AR content.

Sensor data from the one or more sensors may be processed locally by the CPU to control display output, and/or transmitted to a server for processing by the server in real time, or for non-real time processing. As used herein, "real time" refers to processing responsive to user input that controls display output without any arbitrary delay; that is, that reacts as soon as technically feasible. "Non-real time" refers to batch processing or other use of sensor data that is not used to provide immediate control input for controlling the display, but that may control the display after some arbitrary amount of delay.

Components of the display and communications unit 202 may further include, for example, an audio output transducer 220, for example a speaker or piezoelectric transducer in the display and communications unit 202 or audio output port for headphones or other audio output transducer mounted in headgear 224 or the like. The audio output device may provide surround sound or other audio track output accompanying a stereographic immersive VR or AR video display content. Components of the display and communications unit 202 may further include, for example, a memory device 208 coupled to the CPU 206 via a memory bus. The memory 208 may store, for example, program instructions that when executed by the processor cause the apparatus 200 to perform operations as described herein. The memory 208 may also store data, for example, audio-video data in a library or buffered during streaming operations.

Figure 3:
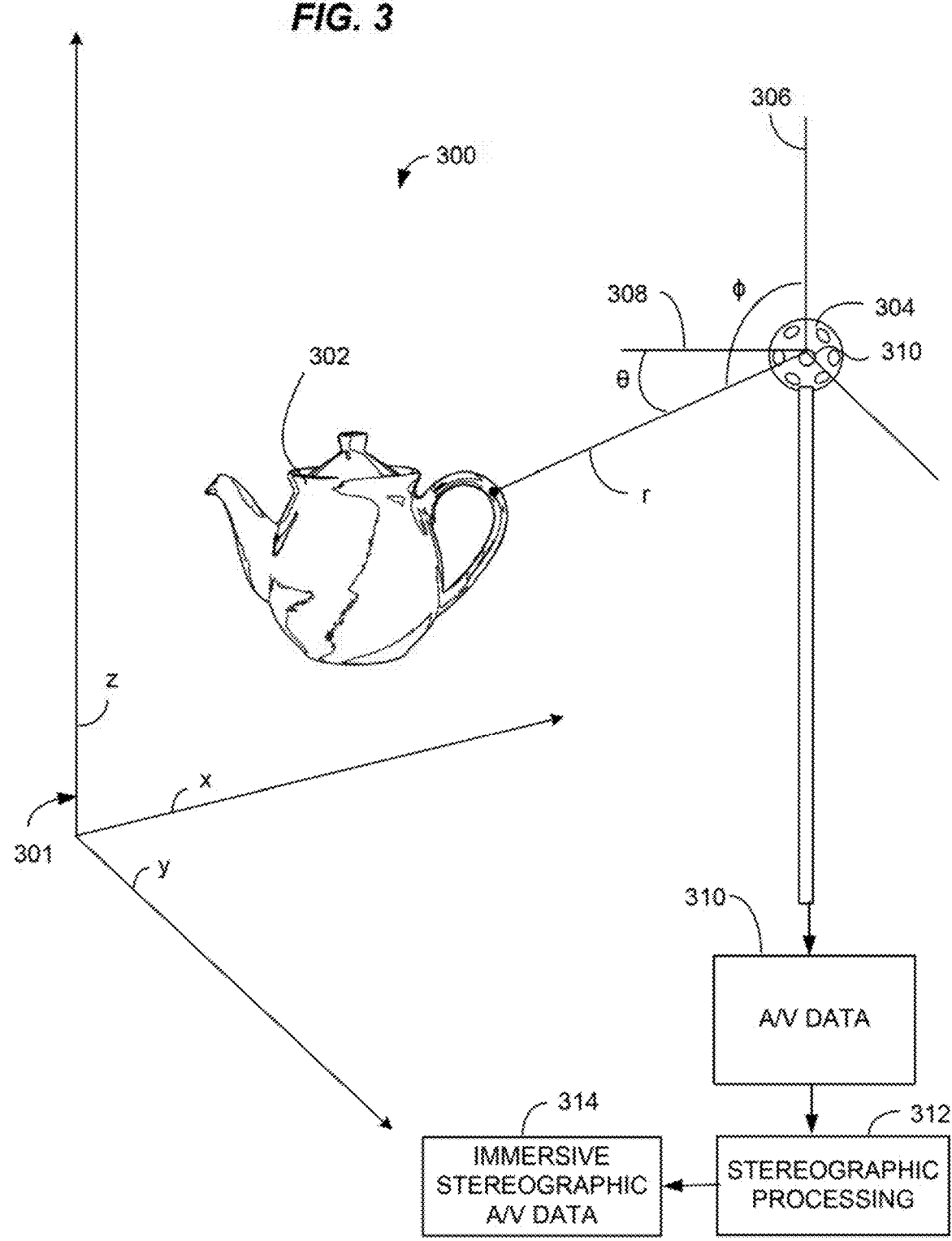
FIG. 3 is a diagram illustrating aspects of coordinate systems, apparatus, and process steps for capturing VR or AR data from a real set.

The present technology concerns in part the use of prerecorded video content in stereographic immersive VR or AR, such as output from devices as described above, or other immersive VR or AR output device. Aspects of coordinate systems, apparatus, and process steps for capturing VR or AR data from a real set 300 are illustrated in FIG. 3. A set 300 may be characterized by a coordinate system 301 (for example, an XYZ Cartesian coordinate system) keyed to a reference object appearing in the set. The set 300 may include one or more target objects 302, which may be actors and/or static figures, and a background which may be a desired final background or a temporary background such as a blue screen or green screen. Video data for immersive VR or AR output data may be captured by a camera array, for example a spherical camera array 304, each camera of which may be assigned a position with respect to the coordinate system 301. In addition, or in the alternative, each camera of the array 304 may be defined with respect to an array-centric coordinate system 306, for example, a spherical coordinate system whereby set objects, e.g., the object 302, and each camera of the array 304 can be located using a radius 'r' and two angles such as a longitude 'θ' and a latitude 'φ'. For example, a position and orientation of a selected camera 310 of the array 304 may define the reference frame 306. Each captured video frame may thereby be associated with a set of coordinates that geometrically relates the viewpoint of each frame to a set-based reference frame 301 or camera-based frame 306 of the set 300. In embodiments, the camera array may provide a video stream from each of its cameras, together making up recorded video data or audio-video data 310. This raw data 310 may be processed in a production process 312 that produces final data 314 for input to an immersive VR or AR output device as described herein.

A fixed or movable spherical camera array 304 as shown in FIG. 3 will result in VR or AR output that enables a user to 'pan' side-to-side or 'tilt' up-and-down in a scene. Such a limited amount of interactivity may sometimes be used for dramatic effect in storytelling, but more generally, will not result in compelling VR or AR content. More compelling VR or AR content should allow the user some degree of movement around the scene, so that the user may witness the action from different perspectives.

Figure 4:
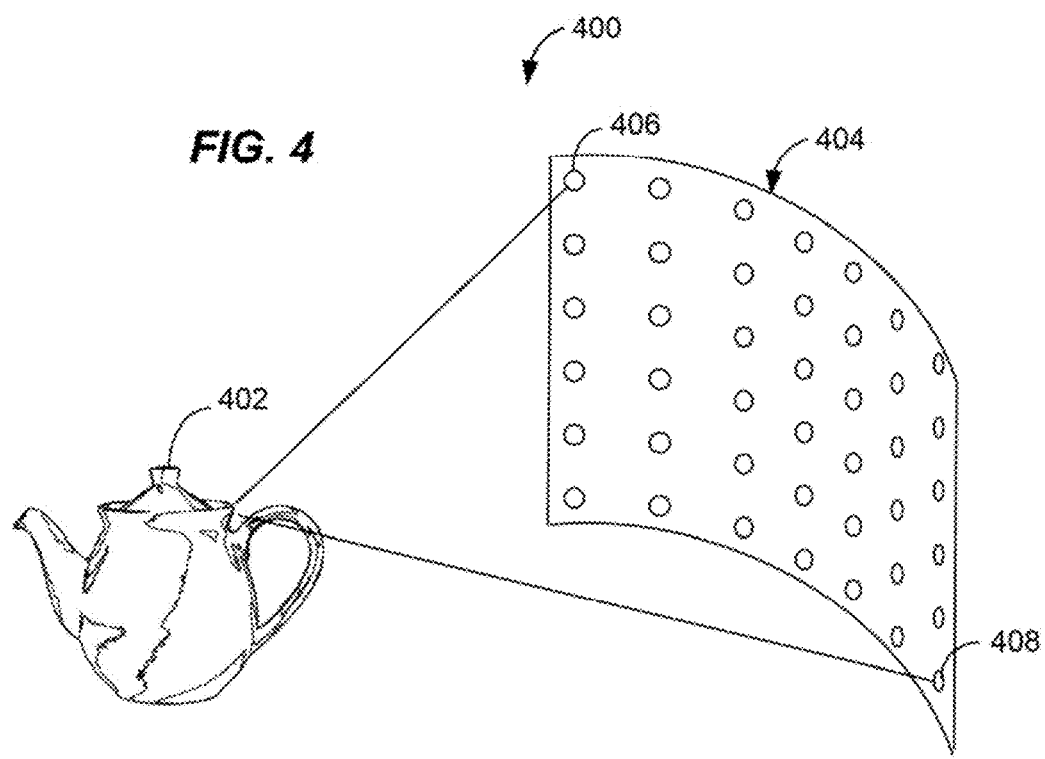
FIG. 4 is a diagram illustrating aspects of an alternative video capture system for providing VR or AR data from a real set.

FIG. 4 shows an alternative form of camera array 404 for filming a scene 400 including a target object 402. The camera array 404 may including a uniformly spaced arrangement of cameras positioned on a two-dimensional ("2D") surface, which surface in the illustrated example has a cylindrical curvature. Any other curvature may also be useful, or no curvature. The surface defined by the camera array may be virtual, not actual. A camera array may be fixed, or mounted on a movable boom, rail or dolly and moved about during filming the scene 400. Each camera, for example a first camera 406, a last camera 408 and each intervening camera, may be oriented towards a designated target 402 and focal depth/length controlled as a group. Whatever the shape or arrangement of a camera array, it may be used to produce synchronized video data wherein each camera provides a particular frame sequence or "stream" within the framespace for any particular video clip.

Figure 5A:
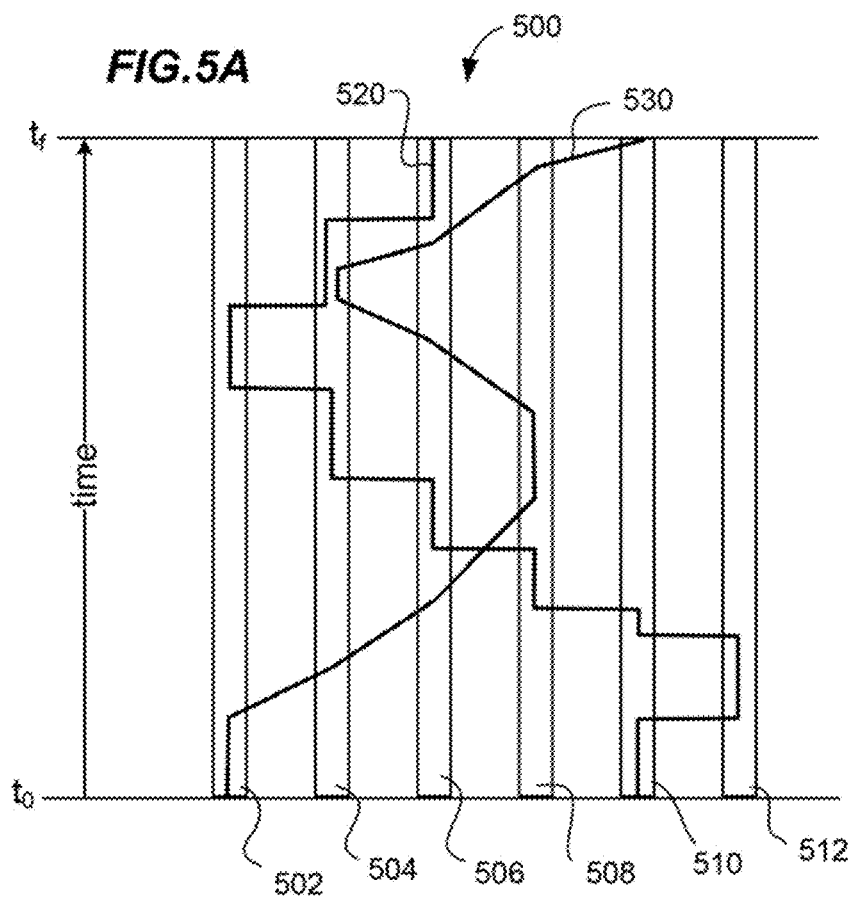
FIG. 5A is a time chart showing aspects of framespaces and paths.

FIG. 5A illustrates the concept of a framespace 500 with respect to a video clip or segment running from an initial time or frame to $t_0$ final time or frame $t_f$. The framespace 500 includes six frame streams 502, 504, 506, 508, 510 and 512, which in the illustrated simplified example are separated by a single position coordinate, for example, an 'x' coordinate of a Cartesian space. It should be appreciated that a single coordinate is illustrated for illustrative simplicity, and different frame streams may be separated in numerous dimensions, for example, by three position coordinates, a view vector, a focal depth, and/or by other camera metrics.

The frame streams are illustrated as parallel, as indicating data from a camera array in which each camera is fixed relative to others. However, framespaces may also include non-parallel frame streams introduced by movements of cameras within the array relative to one another. Each frame stream may be embodied at least in part as an electronic file, portion of a file or other electronic data set encoded in a non-transitory computer-readable medium using a suitable video coding format. Such coding formats may include, for example, MPEG-2, MPEG-4, Advanced Video Coding (AVC) sometimes referred to as H.264, High Efficiency Video Coding (HEVC) sometimes referred to as H.265, QuickTime File Format, AVI, Flash Video (FLV), F4V, Windows Media Format, or Nullsoft Streaming Video, and may include both video and audio data. Each frame stream may represent a binary pair of stereographic video data. In the alternative, each frame stream may represent a single one of a binary stereographic pair, or simply a single viewpoint for non-stereographic data. In the illustrated example, an interstitial space exists between each frame stream for which no recorded video data exists. Any desired time-coherent framespace path may be produced by selecting frames in sequence across the framespace 500. For example, a stepped path 520 may start at the frame stream 510 and move across the framespace in a stepped fashion, ending up at frame stream 506. With each "jump" across an interstitial space, the user may notice a jump or jitter in the viewpoint. The magnitude of such jumps may be reduced by spacing the cameras in an array more closely together, but at the cost of increasing the need for additional cameras and the amount of framespace data generated.

To reduce jitter, an interpolated framespace path, for example, path 530, may be defined that includes interpolated frames in the interstitial spaces between frame streams. For example, when moving from the initial frame stream 502 to a second frame stream 504, some non-zero number of frames may be generated by interpolation between streams 502 and 504, and used to smooth the transition between different streams. Such generation of interstitial frames may allow wider spacing of cameras in an array without introducing jumpiness, but at the cost of increasing image processing demands. Such image processing demands may become an issue for real-time VR or AR processing. In either case, the director and/or end user may be provided freedom to experiment with different user perspectives from a given recorded framespace by defining different paths across the frame streams making up the framespace.

With respect to frame interpolation, it should be apparent that 2D view interpolation techniques may apply to stereoscopic VR or AR techniques, with consideration of additional factors that are inapplicable to 2D view interpolation. For example, to enhance the participant's impression of "being there" in VR or AR, it may be important to provide stereoscopic views rendered based at least in part on the participant's personal Interpulllary Distance (IPD)—also called interocular or human eye separation. Thus, stereoscopic views of prerecorded video may be enhanced by rendering in the VR or AR headset based on the IPD of the specific participant that is wearing them. This rendering technique may enhance the VR or AR experience by meeting the participant's own personal "orthostereoscopic" conditions, recreating the size/shape/depth of geometric perception for the participant that they would see if actually present in the VR or AR. Without this enhancement, the visual impression may be less convincing or even disorienting.

For various reasons, in traditional stereoscopic 3D movie production, camera separation is usually much less than the average human IPD (63.5 mm), and, for example, may often be set somewhere in the 10-40 mm range. Further, camera separation may vary from shot to shot, and separation of the cameras sometimes varies even during a shot. It has been found that use of a smaller than 63.5 mm camera separation provides a pleasing stereoscopic 3D image experience on large theatrical screens, and also produces images that can be more easily intercut with other images with different camera settings. In contrast, for VR or AR stereoscopic rendering to achieve a sense of "being there", it may be preferable to not vary the camera separation much or at all. However, if the production uses miniature physical models, camera separation may need to be scaled down accordingly, i.e., to the scale of the miniatures.

In practice, camera separation within the camera arrays as described above may not exactly match the IPD of the participant, at least for the reason that the IPD will vary from participant to participant. Nonetheless, it may be advantageous for camera separation in the camera arrays to match, for example, an estimated average or median IPD of the expected audience, or some other value based on aggregate IPD data, to prevent large discrepancies between the acquired camera separation and the rendered camera separation, and/or to reduce the amount of interpolation needed to provide a desired stereoscopic output and to realistically simulate movement through the VR or AR scene.

Some discrepancies between camera separation and viewer IPD are inevitable, at least for some participants. The amount of variation in IPD between individuals may be substantial. For example, in *Variation And Extrema Of Human Interpupillary Distance*, Dodgson, Neil A, pp. 36-46, Proc. SPIE, Vol. 5291, ISSN 0277-786X, it was reported that in 2976 measured subjects of both genders, IPD ranged from a minimum of 52 mm to a maximum of 78 mm, with a standard deviation of 3.6 or 3.7 mm, depending on gender. Interpolation of viewpoints for stereoscopic output may therefore enhance a realistic effect by customizing the interpolated camera separation for a participant's personal IPD measurement. To facilitate this function, and enhance the participant's experience, VR or AR simulators may include a setup process that allows the participant to measure his or her own IPD, and the measured IPD may then be provided as an input to a stereoscopic frame generation process.

In addition, a creative process may allow manipulation of the IPD to serve the director's intended narrative or artistic effect. For example, a director may want to simulate the view of a mouse which would have a very small IPD or a large giant which would have a huge IPD. For most camera arrays, the availability of frame streams from multiple cameras of known position should allow the VR or AR output process to simulate any arbitrary camera separation. One method for adjusting a simulated camera separation may be based in a specified offset of the interpolation target for one of a pair of stereoscopic frames. For example, a first frame of the pair may be based on a frame stream from a camera that is nearest to a calculated viewpoint of the user, and then the second frame interpolated to match a distance equal to the user's IPD (or some other IPD distance) to the left or right.

As noted above, frame interpolation may also be used to reduce "jitter" caused by jumping abruptly from stream to stream within a framespace. Another approach to reducing jitter may reduce or eliminate the need for frame interpolation by moving cameras (either single cameras or stereographic pairs) in the array with respect to one another. For example, in a one-dimensional (linear) array each camera may be moved back-and-forth in a cyclical sinusoidal pattern that alternately brings it immediately adjacent to its right and left neighbors. The period of such cyclical motion may be selected so that the side-to-side motion is not perceptible to the user, or barely perceptible, based on the geometry of the scene and camera settings. For further example, in a two-dimensional camera array, each camera may be moved in a circular or elliptical cycle that alternately brings it immediately adjacent to its surrounding four neighbors. A framespace produced by such a cyclically moving array may resemble a lattice when viewed in a two-dimensional chart 501 representing camera movement in a single dimension, as shown in FIG. 5B. The framespace 501 includes six sinusoidal frame streams 503, 505, 507, 509, 511 and 515 each produced by a corresponding moving camera of an array, which in the illustrated simplified example are separated by a single position coordinate, for example, a 'x' coordinate of a Cartesian space. It should be appreciated that a single coordinate is illustrated for illustrative simplicity, and different frame streams may be separated in numerous dimensions as explained for the non-latticed framespace chart 500.

As shown in FIG. 5B, the framespace time chart 501 illustrates that any latticed dimension of the framespace may be traversed without interpolation, for example, as shown by path 521 that originates in stream 503 and ends up in stream 509, without ever crossing an interstitial space. The framespace may also be traversed by interpolation across interstitial spaces, like the non-latticed framespace 500. A disadvantage of an array with moving cameras is the increase in mechanical complexity and constant periodic motion of the cameras makes it impossible to view a scene with the camera at rest, without interpolation of view position. The latter disadvantage may be eliminated by including static (immobile) cameras in the array at regular intervals. For example, the frame stream 513 from a static camera illustrates the effect of including a static camera in an array producing a framespace. It is apparent that the lattice structure of the framespace 501 is preserved, enabling static views from selected viewpoints, while the frame stream 513 represents a static point of view.

Thus, a camera array 523 or 543 as shown in FIGS. 5C-D, respectively, may include both static and moving ("traveling") cameras, as illustrated by the diagrams of FIGS. 5C and 5D. FIG. 5C illustrates a portion 523 of a camera array including static cameras 525, 527, 529, 531, and 533 fixed at nodes of a rectangular grid pattern. Back-and-forth traveling cameras 535, 537, 539, and 541 bridge the gaps between each static camera in the array. Frame streams from an array as illustrated in FIG. 5C would be latticed at regular intervals and the resulting latticed framespace would be computationally simple to navigate without interpolation. FIG. 5D illustrates a portion 543 of an alternative rectangular grid camera array wherein static cameras 545, 547, 549, 551 and 553 at nodes of the grid are serviced by a single traveling camera 555 tracing out a cross pattern. This arrangement reduces the number of traveling cameras needed in the array relative to an array as shown in FIG. 5C, at the expense of a less densely latticed framespace if all other factors are equal. Possible camera arrays including both traveling and static cameras are not limited to these examples. In addition, an entire array including static and (if present) traveling cameras may be moved as a unit around a scene using a dolly, rail, truck, boom, or other mechanism, while filming the scene.

For rendered scenes, mechanical limitations on camera arrays are non-existent, and limitations on the density of a framespace lattice are computational only. It is even possible to construct fully three-dimensional camera arrays in a rendered scene. Latticed framespaces may be of use for rendered scenes to allow user navigation through high-quality rendered data in real time, while retaining security of underlying three-dimensional models, algorithms and settings used for rendering.

FIG. 5E illustrates an example of a data structure 550 (e.g., a data table) illustrating metadata and dimensional aspects of multi-dimensional framespaces. The data structure 550 may characterize prerecorded immersive VR or AR data in an electronic memory of a VR or AR video content server or display device, whether generated by a camera array or by non-real time rendering of a virtual set. The video data itself may be held in a separate file wherein each frame is cross-referenced to frame characterization and/or geometrical parameter data as shown. Any given set of frames, for example, frames 552, 554, 556, and 558 (four of a great many shown) may each be associated by the data structure 550 with certain non-geometrical metadata associating the frame with a particular content identifier 560, clip or segment identifier 562, sequence number or time 564 within the indicated clip, frame type identifier 566 and other image or image compression characteristic identifiers, a stream or camera identifier 568, or other non-geometrical parameters. In the alternative, some or all of such non-geometrical data may be maintained in a separate data structure, and/or implied by a video coding format used for storing the video frame data.

Each frame may further be associated with geometrical parameters defining a geometrical relationship to a set or camera array for the set. For example, the data structure 550 may include geometrical data fields such as, for example, a set of one or more view position coordinates 570, a set of one or more view vector orientation coordinates 572, a view focal length 574, a focal depth 576, an aperture or depth of field 578, or other geometrical parameter for the frame. Depth data may include, for further example, data from light-field camera (e.g., per Lytro™ light-field capture using micro-lens arrays) capture of pictures or video so that different parts of the captured images/video (e.g. objects of interest) can be focused on in the frame stream. In the alternative, or in addition, light from a single aperture may be split among different lens systems, enabling simultaneous capture of video from a single viewpoint using different lens settings. Such settings may include, for example, depth of focus, focal length, or depth of field. These settings may represent additional dimensions of framespace, if available.

FIG. 5F illustrates an example of a data structure 580 (e.g., a data table) illustrating metadata and aspects of higher-level narrative elements for VR or AR content. At a lower logical level, each frame may be associated with a clip or segment of video data embodied as an electronic file, portion of a file or other electronic data set encoded in a non-transitory computer-readable medium using a suitable video coding format. Each clip or video segment, in turn, may be associated with a scene that has some narrative value. The content at a higher logical level may be conceptualized as an organized sequence or tree made of the narrative scenes, which may include alternative story lines. Each particular 3D scene in a narrative structure may be associated by the structure 580 with a related framespace identifier 582, one or more sequential clip identifiers 584, a story tree node identifier 586, an identifier 588 for a set of render constraints if real-time rendering is enabled for the scene, an audio track(s) identifier 590, and a user interface specification identifier 592 that specifies how the targeted player device interacts with prerecorded or rendered scene data. The data structure 580 may also characterize prerecorded immersive VR or AR content in an electronic memory of a VR or AR video content server or display device, albeit at a higher level than the data structure 550.

With this concept of narrative scenes in mind, FIG. 6 illustrates further aspects of narrative branching in immersive VR or AR content 600 for storytelling, and relationships to framespace paths described in connection with FIG. 6. In the context of a higher-level narrative structure that includes multiple alternative story lines, a set of alternative story lines may be implemented using two basic types of branching between clips, as well as clips that are sequential without any branching possibility. Four clips 602, 604, 606, 608 of a potentially much greater number are illustrated in FIG. 6, with each clip being a node of a narrative tree or "story tree." It should be appreciated that the time gap between sequential clips (e.g., between clips 602 and 606, 604) is greatly exaggerated for illustrative clarity. In an actual VR or AR content, such gaps should be about one frame period long. Each of the clips 602, 604, 606, 608 defines a framespace including the six (for example only) frame streams as shown in FIG. 5A. An interpolated (non-stepped) framespace path 610 is defined across the clips 602, 606, and 608. A stepped path may also be used.

A diverging branch is illustrated by the clips 604, 606 located on divergent nodes of a narrative tree 600 branching from initial clip 602, with each possible distinct path between the first and last nodes along different branches between the first and last nodes 602, 608 making up one of alternative story lines of a story tree. A converging branch is illustrated by the convergence of these nodes 604, 606 to a fourth clip 608. The frame path 610 may cross clip boundaries within a corresponding frame stream as illustrated between clips 606 and 606, where the path remains in the 5th stream from the left across the clip boundary. In the alternative, between some clips the path may be allowed to jump between streams, as illustrated between clips 606 and 608, where the path exits clip 606 at the 6th stream and enters clip 608 at the 4th stream.

Converging and diverging branches may be arranged to provide any desired narrative tree having any plural number of alternative story lines. Navigation in the VR or AR may be performed at two levels: within the framespace of a clip, and at a higher level, across different nodes of a narrative tree, wherein each possible unique sequence of nodes (e.g., 602-604-608 or 602-606-608) is one story line of the alternative story lines making up the narrative tree. Navigation at one or both levels may be controlled in response to sensor data from one or more immersive VR or AR output devices, for example as shown in connection with FIGS. 1-2.

Sensor data from an immersive VR or AR output device may be used to inform navigation through a story tree or framespace in various ways. In some embodiments, sensor data may be used in near-real time or perceptive real time to control display output in response to bodily (e.g., head, eye) movements or other inputs of a particular user, as illustrated by process block diagram 700 shown in FIG. 7. Elements of the process 700 may include client-side components for user input and display, for example a user input interface 702 that receives sensor data and produces from the sensor data an information stream configured for control of an immersive VR or AR display, using a programmable processor outputting the information as in electronic signal, for example, using TCP/IP (Transmission Control Protocol/Internet Protocol). The client-side components may further include a display 712, for example a stereographic display screen as previously described in connection with FIGS. 1 and 2.

The process 700 may include framespace navigation components 720 also referred to as a "frame engine," which may be remote server based, client-side, or some combination of client and server components. Sensor-derived information from the user input interface module 702 may be received by a framespace navigation module 704, which interprets user input in the context of the client's status in relation to the current framespace and/or story tree to develop framespace or story tree navigational output. The navigation module may provide the navigational output to a frame server module 706, which accesses the framespace database 708 and extracts the video frame data needed to service the navigational request. The frame server 706 may organize the extracted video frame data in a frame stream, which if necessary, may be further processed by a blending and interpolation module 710. The blending and interpolation module 710 may combine rendered image data with recorded image frames and compute any missing frame data from interstitial parts of the framespace using interpolation or other algorithms. Other video processing functions may include, for example, compositing stereographic frame data into a single side-by-side frame or interlaced frame. The module 710 may transcode the resulting frame stream into a video format and resolution requested by the target client display device 712, subject to applicable bandwidth constraints. The display device plays the received video stream. All of the back-end processing done by the frame engine 720 may be transparent to the user, who enjoys the experience of moving a viewpoint around a scene or other enhanced features, in response to head movement or other bodily movements. The pre-recorded framespace data may be warped or modified to consider the position and pose of the user wearing the VR or AR goggles.

Figure 8:
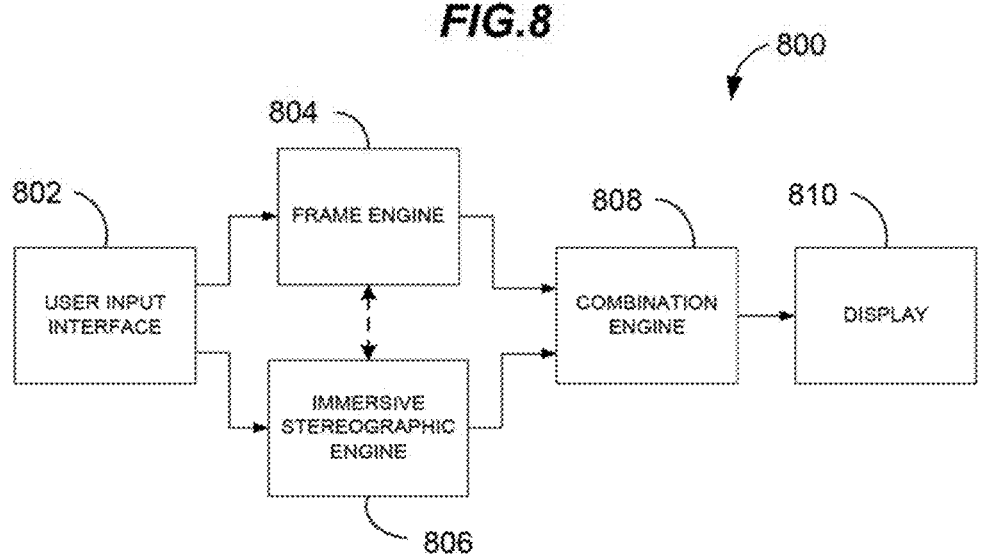
FIG. 8 is a conceptual block diagram illustrating components of a process and apparatus for combining prerecorded framespace data with real-time rendered content in a process or apparatus outputting immersive stereographic content for storytelling.

In other embodiments, as summarized by process 800 diagrammed in FIG. 8, pre-recorded framespace data may be enhanced by real-time rendering of certain objects within a scene. A database of 3D objects may include, for example, static objects or animated characters. A visual database of objects of interest may be stored with 360 degree views, or as 3D objects for real-time rendering, so that otherwise occluded parts can be displayed at rendering time as the user's point of view changes relevantly, or in response to other user input. Real-time rendering enhancements may include, for example, rotating an object or character to enable views of occluded surfaces, and/or allowing the user to look around or behind said object(s). Real-time rendering enhancements may further include digitally replacing one character with an alternative character (or one object with another). A combination framespace and real-time rendering process 800 may include a user interface module 802 receiving user input, which may include bodily motion and other inputs indicating a request for real-time rendering enhancement.

A frame engine 804 like the engine 720 of FIG. 7 may receive a portion of signals from the user input interface 802, process the received signals, and provide a frame stream as described above for frame engine 720. Another portion of the signals may be received by an immersive stereographic engine 806 that produces rendered data from a 3D model using a rendering engine, among other things. In response to the user input signals, the immersive stereographic engine 806 may retrieve model data and render settings, consult (i.e., exchange signals driven by automatic coordination routines) with the frame engine 804 regarding applicable frame data, look up geometric and image parameters for the applicable frame data, animate the character (if applicable) or static object based on frame position and user inputs, render the animated character or static object based on image and frame parameters, key the rendered image frames to a frame stream being handled by the frame engine 804, and provide the rendered object frames to a combination or compositing engine 808.

The compositing engine 808 may receive the recorded frame stream from the frame engine 804 and the rendered frame stream from the immersive stereographic engine 806 and composite the frames according to a compositing scheme which optionally may be one of many selected by user input. For example, user input may indicate that the rendered object should replace a portion of the recorded image frames entirely. In an alternative, the user input may indicate that the rendered object should be overlaid as a semi-transparent layer over the recorded images of the recorded frame stream. The combination engine 808 may composite the two frame streams by the user-indicated method, or by a default method, and may provide the composited frame stream to a display device 810 of an immersive VR or AR output device, or other display device. The virtual reality engine 806 may comprise a client-side component, a remote server-side component, or may be distributed among two or more client and server components.

Figure 9:
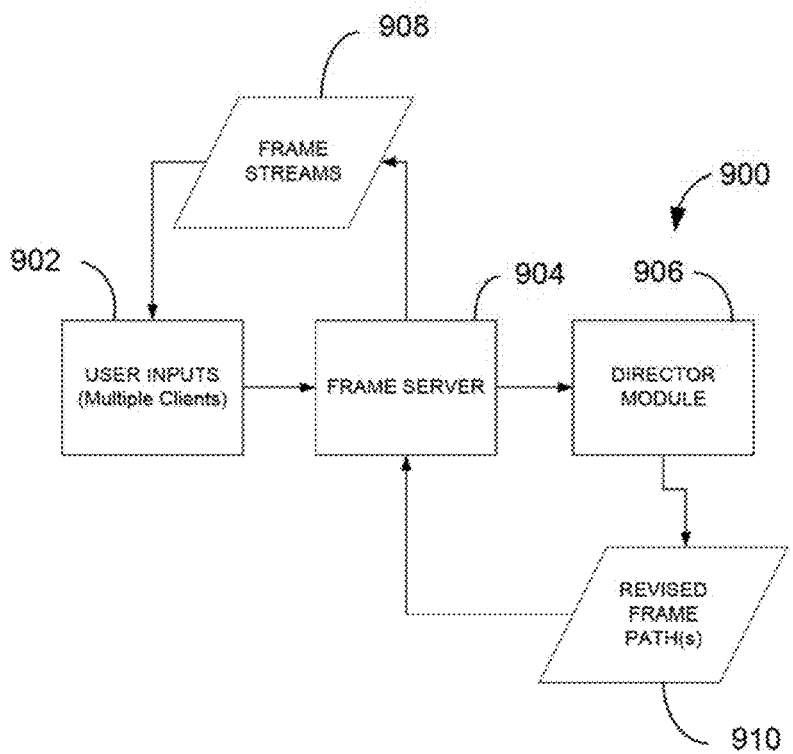
FIG. 9 is a conceptual block diagram illustrating components of a process or system managing an audience-responsive narrative or framespace path for storytelling using immersive stereographic content.

In other embodiments, sensor data aggregated from multiple clients may be used to develop new paths through a story tree or framespace. In other words, navigation through a story tree or framespace may, in a sense, be "crowd-sourced" or made responsive to audience feedback of various types. In a crowd sourcing process 900, illustrated by FIG. 9 immersive usage data from multiple playback devices 902 may be collected by an application running a frame server 904 and used to modify the storyline or framespace navigation experience. Crowd-sourced modification differs from today's "finish and release" of video content such as feature motion pictures. Modifiable aspects of the immersive stereographic data enable the user to repeat playback again and again with different results each time. In this concept, the content storyline or framespace path can be "self-modifying" based on user feedback statistics collected from multiple inputs 902. A frame server module may provide draft modifications to a director module 906, which may allow for oversight and creative input to assure artistic boundaries are not crossed. The director module 906 may prepare one or more revised framespace paths 910 for storyline or viewpoint navigation and provide to the frame server 904. In turn, the frame server 904 may serve frame streams to multiple clients 902 based on the revised framespace paths 910. The process 900 may be a non-real-time feedback process that enables pre-recorded video content to evolve with additions from the content creator based on audience feedback over time.

The immersive usage data from playback devices 902 may be used, for example, to inform the story and/or modify the storyline related to: an area of focus (where the head has turned); a duration of time spent with focused attention; or use of any controls to zoom in or inspect further. Modified frame streams may include, for example, informing performance metrics of a framespace navigation application, increasing detail or resolution of the areas that have received more audience attention, allocating increased rendering performance (e.g. MIPS) for scene detail of interest as per the statistics gathered, allocating a mix of pre-rendered scenes (in classic VFX) versus real-time rendering via a game engine (more common in VR or AR), selecting a more optimum compositing scheme for the specific storyline, or other changes. Benefits provided by the process 900 may include enabling a changing "VR app" or "AR app" which improves with age and use. With the addition of archiving for past versions, the process 900 may also enable a versioning capability to accommodate demands for watching a certain "vintage" of the framestream or framespace.

In general, audience feedback data may include user head, eye, and extremity movements or positions, inter-ocular spacing, GSR/skin temperature, audio or electrode heartbeat monitoring, body pose recognition data, gesture recognition data, or other biometric feedback as input to the VR or AR app to modify the storyline/experience and as analytic data after the media experience is over. This could be done with sensors that gather clinically useful data such as blood flow and skin hydration with extremely high sensitivity. Various sensors are known in the art for biofeedback monitoring. Although biofeedback is more common in medical arenas, now with the immersive apparatus of VR or AR, there are opportunities to use it for creative purposes, including informing the creative team of audience reactions to immersive stereographic content, to permit individualized control of viewpoints and selection of alternative storylines, and to crowd-source development of framespace paths or storyline selections for pre- or post-release evolution of versions.

Referring to FIG. 10, a process 1000 for producing immersive VR or AR data based at least in part on video recorded from a physical scene 1002, and/or rendering of a modeled scene from multiple viewpoints 1004, may include any one or both of physical capture 1002 or rendering of a virtual scene or object 1004 to produce multiple video streams making up a framespace. Video data is created according to a director's plan, and edited 1006 to fit a targeted story design. Once the edited data is ready, it may be organized into a framespace that is navigable based on selected geometric parameters, as discussed above, in a framespace creation process 1008. In parallel, an "audio space" comprising one or more audio tracks may be developed and synchronized to frame streams making up the framespace, in an audio design process 1014. Audio design 1014 may include, for example, use of techniques to create 3D soundfield areas or objects of interest, for example as described in U.S. Pat. No. 8,755,432 B2 "Method and Apparatus for Generating 3D Audio Positioning using Dynamically Optimized 3D Space Perception Cues," or other suitable techniques. Once the framespace is defined, a default frame path may be defined and the user interface specified for controlling how the path may be modified in real time in response to user inputs, in a path navigation and user interface design process 1010. This may also include a default path through a narrative tree, if the framespace includes narrative branching. Audio design may be coordinated with framespace creation 1008 and navigation/UI design 1010 to ensure that audio elements are synced and coordinated with navigable elements of the space. Finally, a content packaging process 1012 may be used to produce an integrated content package, including audio/video data, rendering data, navigation data and control components for storage on a non-transitory medium.

Content production processes may also include preparing 3D data for real-time rendering, for example, a production process 1100 as shown in FIG. 11. Story design, design of virtual sets and characters 1102 precedes preparation of a renderable space or "3D immersive stereographic creation" 1104 that is mapped in some way to 3D space and viewpoint/camera parameters for real-time rendering. The 3D VR space or AR space may be arranged in a branched or unbranched narrative script, which may be independent of any other narrative, or may be designed as an auxiliary piece for another narrative VR or AR work, for example a prerecorded scripted work as produced using process 1000. To ensure that the user does not encounter viewing parameters that obscure the intended narrative, rendering constraints may be designed at process 1106. These constraints may define, for any given time of the narrative, limits on position and orientations of render viewpoints and other user-controllable render settings. The nature and extent of rendering constraints may vary based on the scene and narrative intent. Some scenes may include a character or set object only, and exclude rendering of background, which will be provided instead of a pre-recorded framespace.

A user interface (UI) design process 1108 may be used to define characteristic responses of render settings to different user inputs. Audio track design 1110, if separate audio is provided, may be done in parallel and coordinated with constraints design 1106 and UI design 1108. A packaging process 1110 may be used to produce an integrated content package or rendering by a real-time rendering engine operating on an immersive VR or AR output device. The package may include 3D model, character and animation data, narrative navigation data, synchronization and coordination data if auxiliary to a principle content package and control components, for storage on a non-transitory medium.

FIG. 12 illustrates a combination process 1200 including elements of framespace production 1000 and a scripted (narrative) immersive stereographic content production 1100. Content packages from both types of production processes 1000, 1100 may be combined to form a combined content package 1202 in which real-time rendered content works in a coordinated way with display of recorded data taken from a framespace.

FIG. 13 illustrates an example of a use case 1300 for navigating a framespace using a client-side user interface and a server-side frame server. Serving a frame stream from a remote server avoids the need to make a local framespace copy or to transmit the entire framespace, but introduces bandwidth demands for wired or wireless streaming transmission to the end user device. Current advanced wireless interfaces routinely handle high-definition video, so the use case 1300 may be appropriate for use with immersive VR or AR devices based on smart phones or notepad computers. An immersive VR or AR device may include a user interface component 1301, for example one or more sensors that indicate user head movement or eye position couple to a stereographic display. The UI component 1301 may be coupled to client-side processing components 1302 for processing user input signals and managing communication with server-side components 1304 that serve a frame stream to the client-side components 1302 via a wired or wireless interface.

At 1306, the user interface component 1301 may receive user input requesting play 1306 of a narrative immersive VR or AR work based on framespace data and provide a signal indicating the request to the client-side components 1302. For example, the user may select and rent a VR or AR work from an online catalog or library. The client-side components 1302 may process the user request 1308 and request an identified frame stream 1310 from the server-side components 1304. The server-side components 1304 may process the request and in response, initiate streaming video 1314 to the user interface device 1301 per a default or user-selected framespace path. The user interface device 1301 displays the streaming video 1316 and this continues until a sensor detects user input 1318. In response to the detection of sensor input, the user interface device provides sensor data or signals to client-side components 1302, which process the sensor output 1320 and send a path modification request 1322 to the server-side components 1304 based on a user interface specification. The server-side components 1304 process the path modification request 1324 and select video frames from the framespace per the requested modified frame path. The server side components may stream the video data 1326 per the modified path to the user interface device 1301. The VR or AR process may continue in this manner until a termination event is detected at 1328, in response to which the client-side components may send a termination request 1330 to the server, which may respond with a confirmation signal 1332, terminating the VR or AR output process 1334 on the client.

Figure 14:
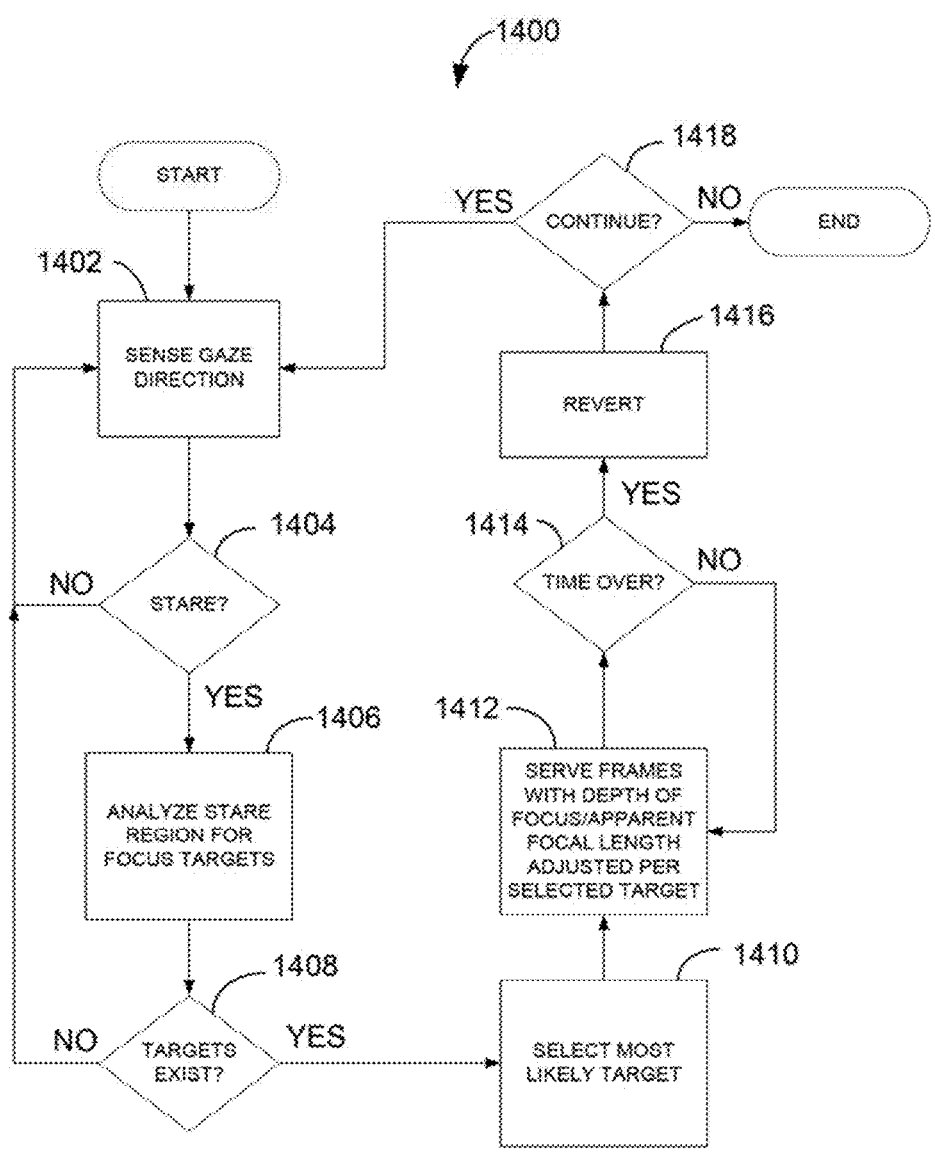
FIG. 14 is a branching flow chart illustrating aspects of a process for focal depth or length control in response to sensor data from an immersive VR stereographic display device.

Features of operating a narrative immersive VR or AR content may include adjusting a depth of focus and/or apparent focal length of a view point in response to user gaze behavior. FIG. 14 illustrates an example of a process 1400 for implementing this feature on a processor of an immersive VR or AR stereographic display device capable of sensing user gaze direction and duration, for example using a camera and image analysis to detect eye orientation, or other sensing process. Once play of immersive VR or AR content is in process, gaze direction sensing 1402 begins. An algorithm executed by the processor may be used to filter ordinary viewing behavior from behavior such as "staring" at an object, at 1404. Inputs to such an algorithm my include not only the length of holding a fixed gaze direction, but also the direction of the gaze in relation to each scene. For example, if the user's gaze is fixed to the center of the screen during an action sequence that is composed at the screen center, this may be analyzed as normal viewing behavior, and not as a "stare." Conversely, if during the same action sequence, a fixed gaze towards an off-center object may signal a "stare" event triggering, at 1406, automatic analysis of the region to which the user's gaze is directed to detect an object or area of focus. At 1408, a processor determines whether or not an object or region of focus is deemed to exist. For example, some gaze directions may be disqualified from triggering focus response.

If no qualified target is detected, the process may loop back to 1402. If a qualified target or target is detected, the processor may execute a routine for selecting a highest priority target in the gaze direction, at 1410. For example, the processor may identify scene object in the served frame within a selected included angle of a detected gaze direction, and prioritize these targets using one or more factors, such as proximity to the center of the line of sight, object type, or other factors. Once a target is identified, at 1412 the processor may, for example by requesting a modified frame stream from a frame server, serve frames having a depth of focus and apparent focal length adjusted per the selected target. For example, for a more distant target, the processor may cause frames with a focal point correspondingly distant from the camera, shallower depth of field and/or a longer focal length to be served. For a closer target, the processor may cause frames with a focal point closer to the camera, deeper depth of field and/or shorter focal length to be served.

The processor may hold the modified focus depth, depth of field and/or focal length for a determined number of frames or time period, for example based on some standard duration, or as a function of gaze intensity. The processor may determine, at 1414, whether the time period has elapsed or number of frames has been exhausted, holding the focus until time has elapsed, and then reverting 1416 the frame stream to the original view. The processor may determine whether to continue to monitor gaze direction at 1418. For example, the processor may continue to monitor the gaze direction until the content is finished playing, or until a video segment for which the focal control function is enabled is over. Additional aspects of the process 1400, and similar methods, are discussed below in connection with FIGS. 19 and 21.

One of more processors of a computer server may cause a server to perform a method 1500 for controlling a story line of immersive stereographic (ISG) content, for example virtual reality or augmented reality content, as shown in FIG. 15. The method 1500 may include, at 1510, collecting, in a computer memory, sensor data from a plurality of immersive VR or AR client devices indicating at least one user biometric during performance of a prerecorded VR or AR video work playing on corresponding ones of the immersive VR or AR client devices. The at least one user biometric may include any disclosed herein above, or any other suitable biometric, for example, head position, gaze direction, eye movement, eye surface shape, pulse (e.g., heart rate), skin temperature, facial expression, hand gesture/movement, body pose, or audible utterances. The method 1500 may further include, at 1520, correlating, using a computer processor, the sensor data to ones of segment identifiers recorded in a data structure, each of the segment identifiers correlated to a different one of prerecorded VR or AR video segments included in the prerecorded VR or AR video work. For example, the correlating may include detecting or inferring a user preference for or lack of interest in a narrative element, based on the sensor data. The method 1500 may further include, at 1530, defining an alternative story line in the form of an electronic data file for a modified version of the prerecorded VR or AR video, based on the correlating and on a library of VR or AR video segments each associated with an alternative story line branch. As used herein, an "alternative story line" refers to one of a set of mutually distinct story lines in a narrative sequence. In the illustrated embodiments, the alternative story line may be embodied as non-transitory electronic data that unambiguously defines one possible sequence of video segments out of a set of multiple, mutually distinct, possible video segments, for example, selecting the next video segment from alternative video segments. A "framespace path" as illustrated at 610 of FIG. 6 is a lower logical level data set that may be partially determined by the storyline for a given framespace, and partially be other input, for example, user biometric feedback from a VR or AR device worn by a user. The method 1500 may further include, at 1540, sending the electronic data file or a portion thereof to at least one of the immersive VR or AR devices for play of a modified VR or AR work comprising prerecorded video frames.

FIGS. 16-17 illustrate additional operations 1600, 1700, respectively, that may be performed in connection with the method 1500. Each of these additional operations is not necessarily performed in every embodiment of the method, and the presence of any one of the operations 1600 or 1700 does not necessarily require that any other of these additional operations also be performed.

Referring to FIG. 16, the method 1500 may further include, at 1610 determining a region of high audience interest based on the sensor data and increasing rendering resources allocated to the region based on a measure of the audience interest. In an aspect, the method 1500 may further include, at 1620, determining the measure of the audience interest based on the sensor data from the plurality of immersive VR or AR client devices while in use by a corresponding plurality of different users. In other words, the audience feedback may be used to select modifications of a framespace path during a performance. In the alternative, such modifications may be performed offline.

Referring to FIG. 17, the method 1500 may further include, at 1710, distributing the prerecorded VR or AR video work as part of a real-time rendered application package, wherein playing of the prerecorded video work is triggered by a user-controllable event defined by the rendered application. For example, prerecorded VR or AR content may be launched from a video game or the like. The method 1500 may further include, at 1720, altering an amount or timing that the prerecorded VR or AR video work is played relative to the real-time rendered application package, based on the sensor data. For example, a user biometric indicating disinterest (e.g., horizontal head shaking) may be used as a signal to terminate play of the prerecorded VR or AR content.

The method 1500 may further include storing a series of versions of the prerecorded VR or AR video work in an electronic data storage component, wherein each of the versions is based on a different set of the sensor data. For example, a server may maintain an archive of past versions as a framespace or narrative path is altered in response to audience feedback. Persons who prefer an earlier version may thereby continue to access it.

Figure 18:
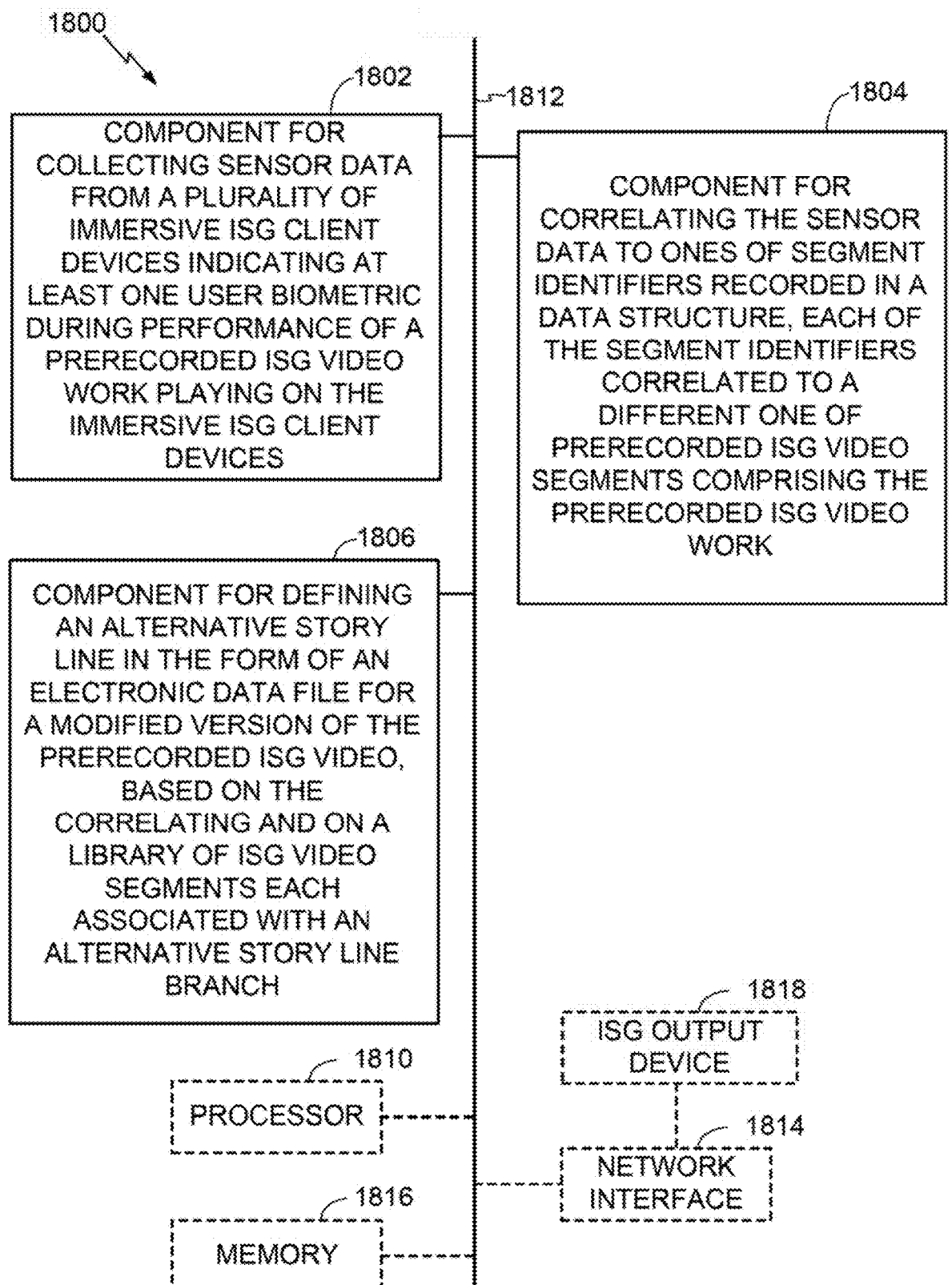
FIG. 18 is a block diagram illustrating components of an apparatus for performing the method(s) of FIGS. 16-17.

With reference to FIG. 18, there is provided an exemplary apparatus 1800 that may be configured as a server for VR or AR content or as a processor or similar device for use within the server. As depicted, the apparatus 1800 may include functional blocks that can represent functions implemented by a processor, software, or combination thereof (e.g., firmware). The apparatus 1800 may include a processor 1810, a memory 1816 coupled to the processor, and an immersive stereographic display device 1818 coupled to the processor (e.g., via a network interface or other coupling), wherein the memory holds instructions that when executed by the processor, cause the apparatus perform the operations of method 1500 herein above, and optionally, one or more of the additional operations 1600-1700, and related operations. In related embodiments, a non-transitory computer-readable medium may be encoded with instructions that when executed by the processor 1810, cause an immersive VR or AR content server to perform the operations of method 1500 herein above, and optionally, one or more of the additional operations 1600-1700, and related operations.

As illustrated in FIG. 18, the apparatus 1800 may comprise an electrical component 1802 for collecting, in a computer memory, sensor data from a plurality of immersive VR or AR client devices indicating at least one user biometric during performance of a prerecorded VR or AR video work playing on the immersive VR or AR client devices. The component 1802 may include a means for collecting, in a computer memory, sensor data from a plurality of immersive VR or AR client devices indicating at least one user biometric during performance of a prerecorded VR video work playing on the immersive VR client devices, or a prerecorded AR video work playing on the immersive AR client devices. Said means may include the processor 1810 coupled to the memory 1816 and to the network interface 1814 of a computer server, the processor executing an algorithm based on program instructions stored in the memory. Such algorithm may include a sequence of more detailed operations, for example, receiving signals from a plurality of immersive VR or AR client devices via the network interface module, determining that the signals indicate sensor data, interpreting the sensor data according to a user interface specification for the client devices and the prerecorded VR or AR video work, and storing the interpreted sensor data in a data structure.

The apparatus 1800 may further include an electrical component 1804 for correlating the sensor data to ones of segment (e.g., video clip) identifiers recorded in a data structure, wherein each of the segment identifiers is correlated to a different one of prerecorded VR or AR video segments included in the prerecorded VR or AR video work. The component 1804 may include a means for correlating the sensor data to ones of segment identifiers recorded in the data structure, as described. Said means may include the processor 1810 coupled to the memory 1816, the processor executing an algorithm based on program instructions stored in the memory and saving resulting data in the memory. Such algorithm may include a sequence of more detailed operations, for example, receiving each of the segment identifiers when a corresponding segment is played on a client VR or AR device, correlating sensor data received during play of the segment to the segment identifier until an identifier for the next distinct segment is received from the same client device, saving a representation of the sensor data in association with an indicator of the corresponding segment identifier, and repeating these operations for multiple segments and client devices.

The apparatus 1800 may further include an electrical component 1806 for defining an alternative story line in the form of an electronic data file for a modified version of the prerecorded VR or AR video, based on the correlating and on a library of VR or AR video segments each associated with an alternative story line branch. The component 1806 may include a means for defining the alternative story line in the form of an electronic data file for a modified version of the prerecorded VR or AR video, based on the correlating and on a library of VR or AR video segments each associated with an alternative story line branch. Said means may include the processor 1810 coupled to the memory 1816, the processor executing an algorithm based on program instructions stored in the memory and saving resulting data in the memory. Such algorithm may include a sequence of more detailed operations, for example, determining a set of narrative elements based on the segment identifiers, determining which of the set of narrative elements of are of relatively greater audience interest, or relatively less audience interest, based on the sensor data or a representation thereof correlated to the segment identifiers and on a data structure correlating biometric indicators to measures of audience interest, selecting an alternative narrative element based on the determination of greater or lesser audience interest, and substituting a video segment including the alternative narrative element for a video segment lacking the alternative narrative element.

With reference to FIG. 18, the apparatus 1800 may optionally include a processor module 1810 having at least one processor, in the case of the apparatus 1800 configured as a data processor. The processor 1810, in such case, may be in operative communication with the modules 1802-1806 via a bus 1812 or similar communication coupling. The processor 1810 may effect initiation and scheduling of the processes or functions performed by electrical components 1802-1806.

In related aspects, the apparatus 1800 may include a network interface module 1814 operable for communicating with one or more immersive stereographic client devices 1818 over a computer network. In further related aspects, the apparatus 1800 may optionally include a module for storing information, such as, for example, a memory device/module 1816. The computer readable medium or the memory module 1816 may be operatively coupled to the other components of the apparatus 1800 via the bus 1812 or the like. The memory module 1816 may be adapted to store computer readable instructions and data for effecting the processes and behavior of the modules 1802-1806, and subcomponents thereof, or the processor 1810, or the method 1500 and one or more of the additional operations 1600, 1700 disclosed herein. The memory module 1816 may retain instructions for executing functions associated with the modules 1802-1806. While shown as being external to the memory 1816, it is to be understood that the modules 1802-1806 can exist within the memory 1816.

Referring to FIG. 19, a method 1900 for controlling a display of an immersive stereographic (ISG) (e.g., virtual reality or augmented reality) content display apparatus may include, at 1910, processing, by a processor of the apparatus, sensor data from at least one sensor coupled to the processor during performance of a VR or AR video work playing on the apparatus for a user. The sensor data may be any useful feedback data, for example as described herein above. The method 1900 may further include, at 1920, determining, during the performance, a virtual position of a region of visual focus in a virtual environment defined by the VR or AR video work, based on the sensor data. Determining the virtual position of the region of visual focus may include processing the sensor data indicating at least one of a user head orientation, a user eye orientation, or a user eye surface shape. The sensor data may be received from the sensor comprising at least one of: an image sensor, an accelerometer, an interferometer, or a microphone. Determining the virtual position of the region of visual focus may include sensing that the user is viewing a limited portion of the display for a qualifying period of time, based on the sensor data. The method 1900 may further include, at 1930, controlling output of the apparatus in response to the determining. The method of claim 19, further comprising receiving the sensor data from the sensor comprising at least one of: an image sensor, an accelerometer, an interferometer, or a microphone.

FIGS. 20-22 illustrate additional operations 2000, 2100 and 2200, respectively, that may be performed in connection with the method 1900. Each of these additional operations is not necessarily performed in every embodiment of the method, and the presence of any one of the operations 2000, 2100 or 2200 does not necessarily require that any other of these additional operations also be performed.

Referring to FIG. 20, the method 1900 may further include, at 2010 controlling the output at least in part by driving an audio transducer with a signal that produces a directional cue indicating a direction of interest for the user. For example, generating a sound that seems to emanate from a particular direction with respect to a current virtual orientation of the user, or providing a spoke cue such as "look up!" That is, the method 1900 may further include, at 2020, selecting the directional cue from the group consisting of spoken language or a sound field configured to be perceived as originating from a particular location of the virtual environment.

Referring to FIG. 21, the method 1900 may further include, at 2110, controlling the output at least in part by adjusting at least one of a depth of focus of the region of visual focus or an apparent focal length on a display of the VR or AR content display apparatus, based on the sensor data indicating that a region of visual focus exists. FIG. 14 shows a process 1400 for determining when a visual focus exists. The method 1900 may further include, at 2120, adjusting at least one of the depth of focus or apparent focal length at least in part by transitioning from a deep focus to a shallow focus, holding the shallow focus for a period of time, and then transitioning back to a deep focus. In the alternative, or in addition, the method 1900 may further include, at 2130, adjusting at least one of the depth of focus or apparent focal length at least in part by shifting a focus point from an original depth towards a foreground object, holding the focus point on the foreground object for a period of time, and then shifting the focus point to a predetermined depth. In the alternative, or in addition, the method 1900 may further include adjusting at least one of the depth of focus or apparent focal length at least in part by shifting a focus point from an original depth towards a background object, holding the focus point on the background object for a period of time, and then shifting the focus point to a predetermined depth. In the alternative, or in addition, the method 1900 may further include, at 2140, adjusting at least one of the depth of focus or apparent focal length at least in part by changing the apparent focal length from an initial length to a second length, holding the apparent focal length at the second length for a period of time, and then changing the apparent focal length to a predetermined length. In the alternative, or in addition, the method 1900 may further include, at 2150, adjusting at least one of the depth of focus or apparent focal length at least in part by at least one of: constructing and displaying a video segment based on photogrammetry metadata of the VR or AR video work for the predetermined period, or displaying prerecorded video segments characterized by an adjusted depth of focus or focal length for the predetermined period.

Referring to FIG. 22, the method 1900 may further include, at 2210, controlling the output at least in part by selecting a video segment from a plurality of possible video segments, wherein each of the possible video segments depicts a different narrative element of a story line. The method 1900 may further include, at 2220, controlling the output at least in part by selecting a video segment from a plurality of possible video segments, wherein each of the possible video segments depicts an event happening at a corresponding one of different locations of the virtual environment. For example, the method 1900 may include, at 2230, serving frames for driving the output from a 2D framespace based on a predetermined framespace path. The method 1900 may further include, at 2240, modifying the framespace path based on the sensor data.

Figure 23:
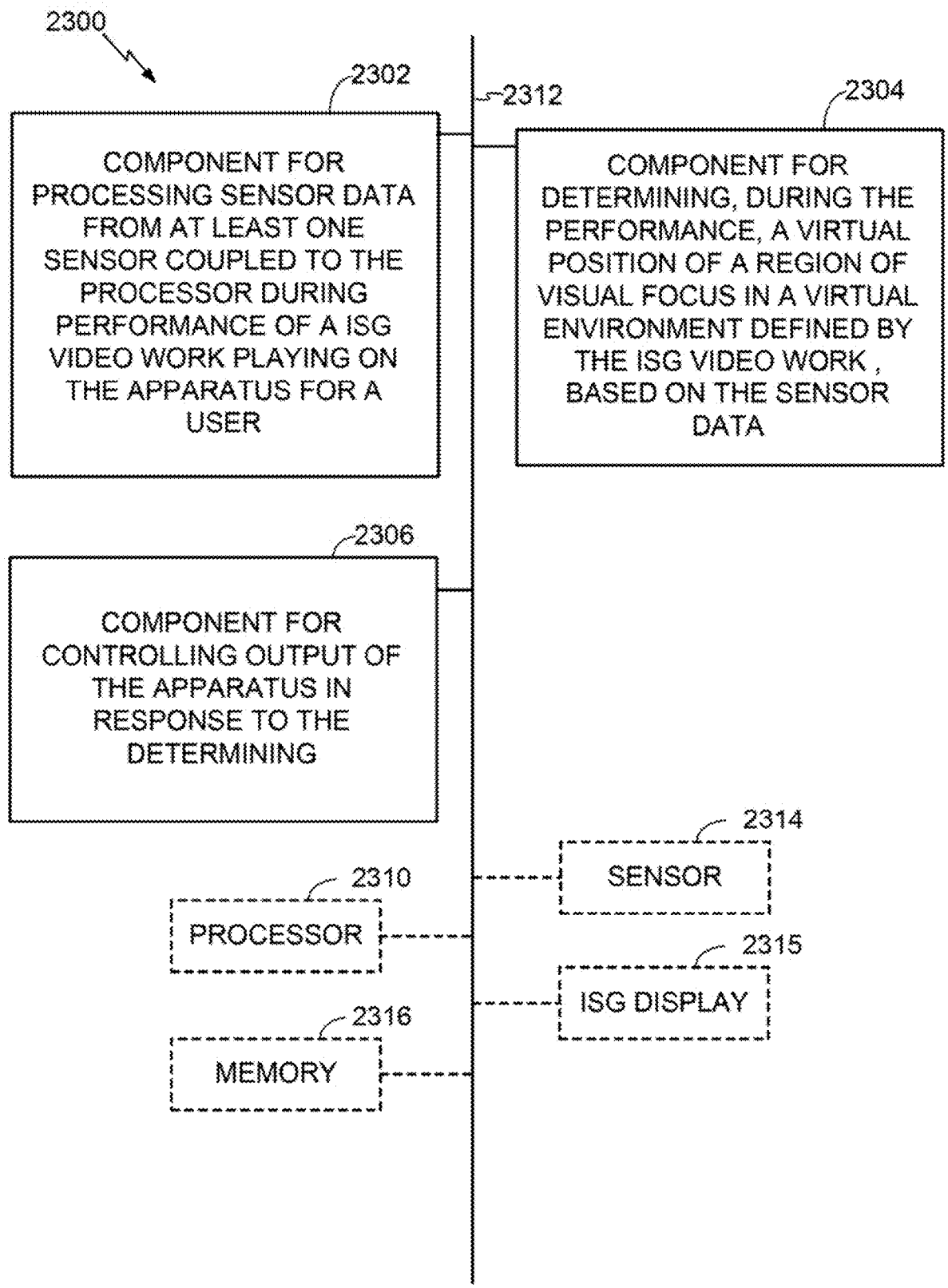
FIG. 23 is a block diagram illustrating components of an apparatus for performing the method(s) of FIGS. 16-17.

With reference to FIG. 23, there is provided an exemplary apparatus 2300 that may be configured as a client device for displaying immersive stereographic (VR or AR) content in response to a user's body movement, or as a processor or similar device for use within the apparatus. As depicted, the apparatus 2300 may include functional blocks that can represent functions implemented by a processor, software, or combination thereof (e.g., firmware). The apparatus 2300 may include a processor 2310, a memory 2316 coupled to the processor, a sensor 2314 and a VR or AR display device 2310 coupled to the processor, wherein the memory holds instructions that when executed by the processor, cause the apparatus to perform the operations of method 1900 herein above, and optionally, one or more of the additional operations 2000-2200, and related operations. In related embodiments, a non-transitory computer-readable medium may be encoded with instructions that when executed by the processor 2310, cause an immersive stereographic (VR or AR) device to perform the operations of method 1900 herein above, and optionally, one or more of the additional operations 2000-2200, and related operations.

As illustrated in FIG. 23, the apparatus 2300 may comprise an electrical component 2302 for processing sensor data from at least one sensor coupled to the processor during performance of a VR or AR video work playing on the apparatus for a user. The component 2302 may include a means for processing sensor data from at least one sensor coupled to the processor during performance of a VR or AR video work playing on the apparatus for a user. Said means may include the processor 2310 coupled to the memory 2316 and to the at least one sensor 2314 and ISG (VR or AR) display 2315 of the client device, the processor executing an algorithm based on program instructions stored in the memory. Such algorithm may include a sequence of more detailed operations, for example, receiving the sensor data through one or more data ports, interpreting the sensor data according to a user interface specification stored as data and/or program instructions in the memory, and determining a user gaze direction based on the interpreted sensor data.

As further illustrated in FIG. 23, the apparatus 2300 may also include an electrical component 2304 for determining, during the performance, a virtual position of a region of visual focus in a virtual environment defined by the VR or AR video work, based on the sensor data. The component 2304 may include a means for determining, during the performance, a virtual position of a region of visual focus in a virtual environment defined by the VR or AR video work, based on the sensor data. Said means may include the processor 2310 coupled to the memory 2316, the processor executing an algorithm based on program instructions stored in the memory and saving resulting data in the memory. Such algorithm may include a sequence of more detailed operations, for example, receiving an estimated gaze direction from an upstream process, determining a period of time for which the gaze is held, determining a set of frames displayed during the period of time, and calculating a region of virtual focus based on the gaze direction, period of time, and geometrical parameters of a scene depicted by the set of frame.

As further illustrated in FIG. 23, the apparatus 2300 may further include an electrical component 2306 for controlling output of the apparatus in response to the output of the determining component 2304. The component 2306 may include a means for controlling output of the apparatus in response to the output of the determining component 2304. Said means may include the processor 2310 coupled to the memory 2316, the processor executing an algorithm based on program instructions stored in the memory and saving resulting data in the memory. Such algorithm may include a sequence of more detailed operations, for example, any one or more of the more detailed operations 2000, 2100 or 2200 shown in FIGS. 20-22.

As further illustrated in FIG. 23, the apparatus 2300 optionally include a processor module 2310 having at least one processor, in the case of the apparatus 2300 configured as a data processor. The processor 2310, in such case, may be in operative communication with the modules 2302-2306 via a bus 2312 or similar communication coupling. The processor 2310 may effect initiation and scheduling of the processes or functions performed by electrical components 2302-2306.

Figure 26:
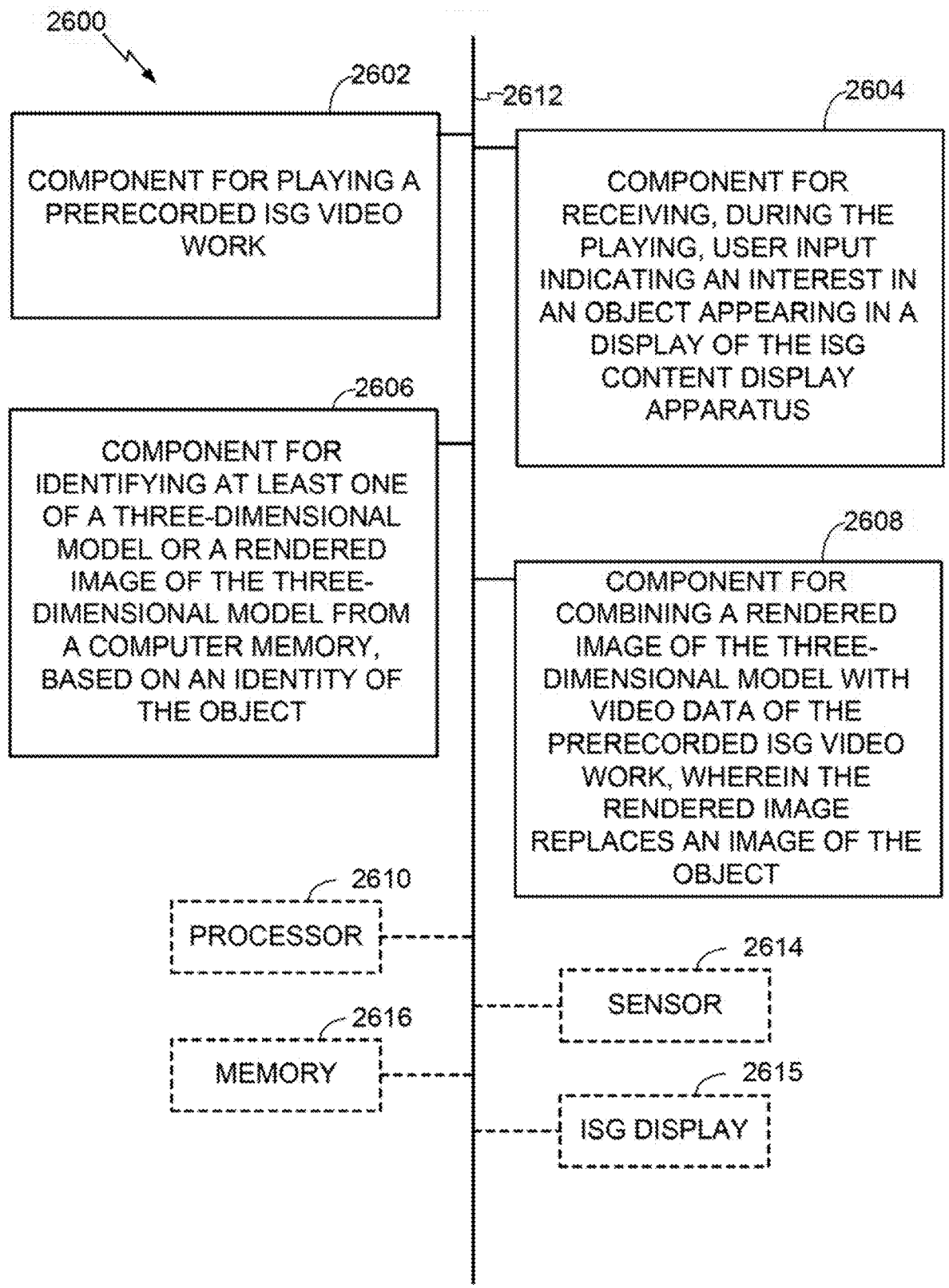
FIG. 26 is a block diagram illustrating components of an apparatus for performing the method of FIG. 25.

In related aspects, the apparatus 2300 as illustrated in FIG. 23 may include a sensor module 2614, as illustrated in FIG. 26, for sensing user movements or biometric information, and a VR or AR display module 2615. In further related aspects, the apparatus 2300 may optionally include a module for storing information, such as, for example, a memory device/module 2316. The computer readable medium or the memory module 2316 may be operatively coupled to the other components of the apparatus 2300 via the bus 2312 or the like. The memory module 2316 may be adapted to store computer readable instructions and data for effecting the processes and behavior of the modules 2302-2306, and subcomponents thereof, or the processor 2310, or the method 1900 and one or more of the additional operations 2000, 2100 or 2200 disclosed herein. The memory module 2316 may retain instructions for executing functions associated with the modules 2302-2306. While shown as being external to the memory 2316, it is to be understood that the modules 2302-2306 can exist within the memory 2316.

Figure 24:
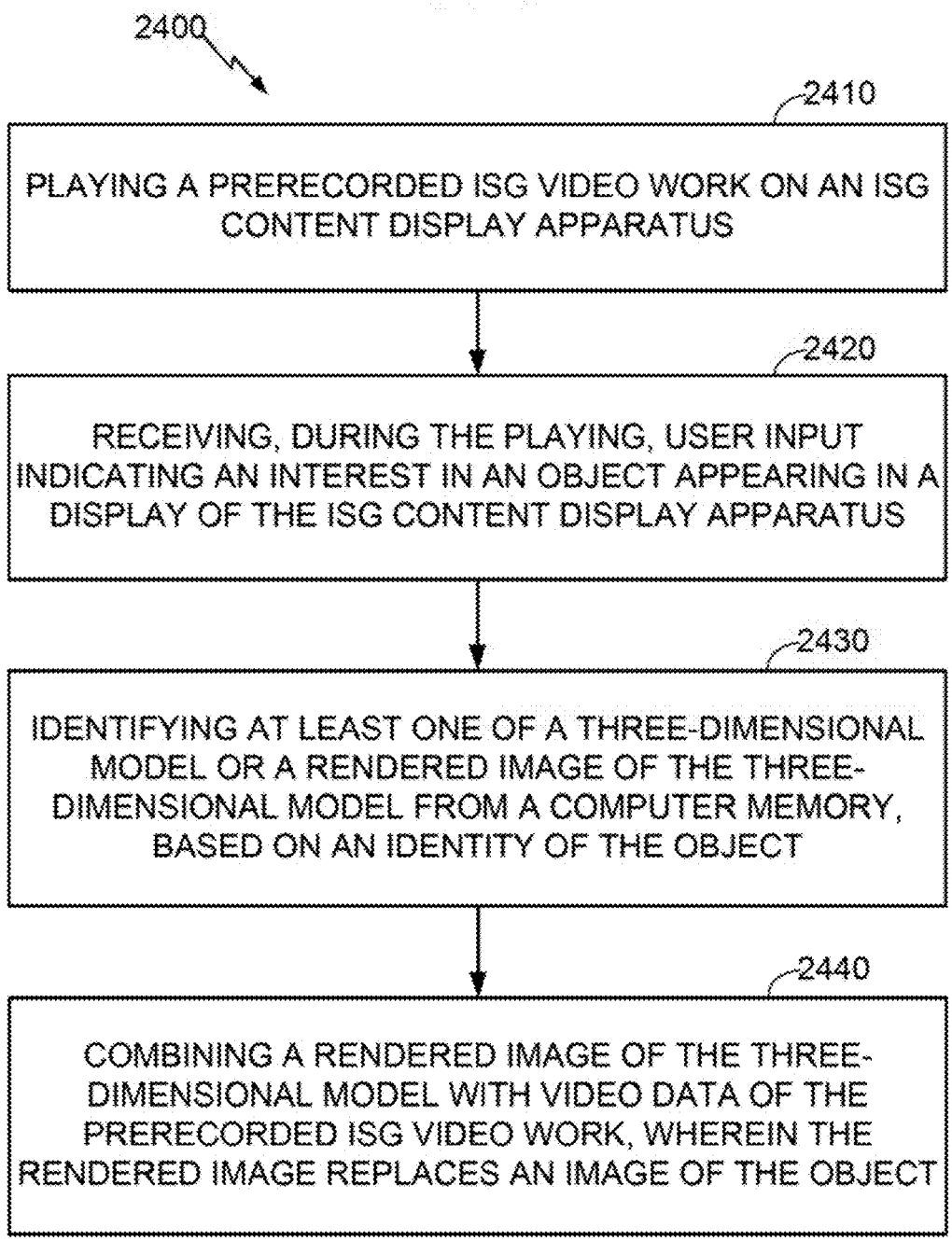
FIG. 24 is a flow chart illustrating operations or aspects of a method for combining real-time rendered output with pre-recorded video frames during play of VR content.
Figure 25:
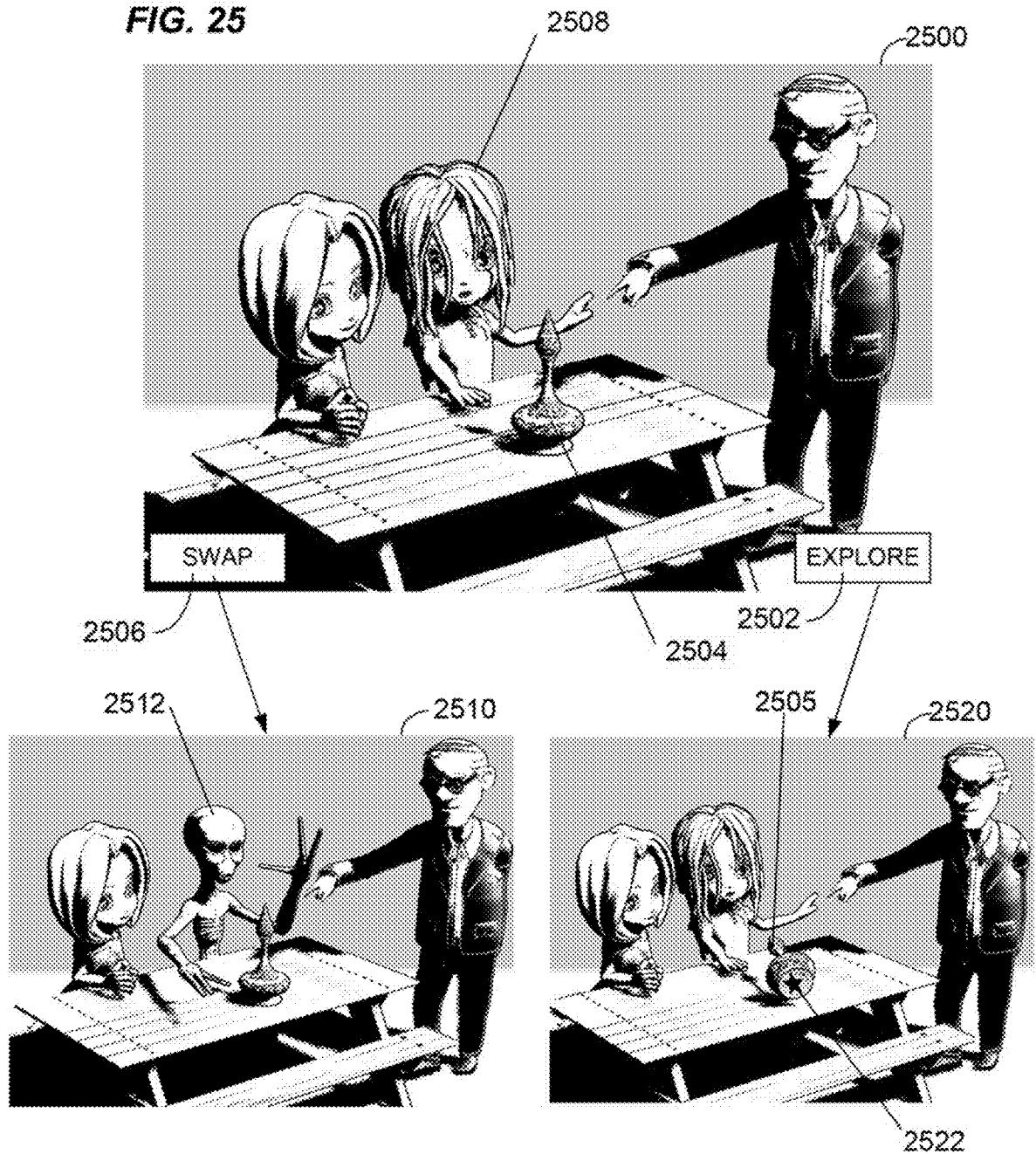
FIG. 25 illustrates examples of video frames such as may be output during a method as shown in FIG. 24.

Referring to FIG. 24, another method 2400 for controlling a display of an immersive stereographic (VR or AR) content display apparatus may include, at 2410, playing a prerecorded ISG video work on an ISG content display apparatus. The method 2400 may further include, at 2420, receiving, during the playing, user input indicating an interest in an object appearing in a display of the immersive VR or AR content display apparatus. For example, referring to FIG. 25, a frame 2500 being one of a sequence of similar frames may include an interactive "explore" object 2502 for enabling a user to indicate interest in an object or set of objects. For further example, a user may highlight the selectable object 2502 appearing in a scene, for example by staring at it or pointing using a handheld pointing device or selecting it by hand (or similar) gesture control in the VR or AR scene. In an alternative, or in addition, the user may highlight an object of interest directly, for example, the urn 2504 or a selectable character 2508. For further example, a second interactive object 2506 appearing in the frame 2500 allows a user to indicate interest in a "swap" feature, which may include character substitution. Receiving the input may include processing sensor data indicating at least one of a gaze direction or a bodily orientation and/or movement of a user of the immersive VR or AR content display apparatus or receiving input from a pointing device manually operated by the user.

Referring back to FIG. 24, the method 2400 may further include, at 2430, identifying at least one of a three-dimensional model or a rendered image of the three-dimensional model from a computer memory, based on an identity of the object. For example, referring again to FIG. 25, the computer may identify in system memory a model of the urn 2504, or may similarly identify one or both of the user-selected character 2508 for replacement or a second animated character 2512 not appearing in the original frame 2500 for replacing the first character 2508. For example, user input correlated with video frames may be processed using an algorithm that provides as output electronic identifiers and parameters for replacement objects 2505, 2512, and identifiers and parameters for original objects 2504, 2508. It should be appreciated that the first character 2508 or object 2504 may be entirely represented by, or may include in its representation, photographically captured data (e.g., video data captured using a video camera of a physical scene). The second character 2512 or the user-manipulable object 2505 may be entirely or partly computer generated.

The method 2400 may further include, at 2440, combining a rendered image of the three-dimensional model with video data of the prerecorded VR or AR video work, wherein the rendered image replaces an image of the object. For example, the rendered image of the urn 2505 may replace an image of a similar recorded urn 2504 in the modified frame 2520. This illustrates an effect achieved by an operation of changing a position, an orientation, a position relative to user viewpoint, or an orientation relative to user viewpoint, of the three-dimensional model 2505 in response to user input, whereby the rendered image of the three-dimensional model reveals a view of hidden information 2522 associated with the object that is not visible in the prerecorded VR or AR video work without user interaction with a control interface to alter a view of the rendered object. In the alternative, a rendered image of a three-dimensional character 2512, which may be animated using an armature (i.e., a kinematic chain used in computer animation for motion simulation of characters) based on the known motion of the replaced character 2508, may replace one of the filmed characters appearing in the frame 2510. These examples illustrate that the replacement three-dimensional model may be selected from a prop 2505 for replacing a static object 2504 or a FIG. 2512 movable by an armature for replacing a filmed character 2508. The animated FIG. 2512 may perform actions essentially the same as the original character 2512, or may perform different actions, depending on director decisions. The manipulable prop 2505 may be manipulated in response to user input, for example, turned over to reveal hidden information 2522, a rendered book may be opened to read hidden pages, a container opened to reveal hidden contents, and so forth.

With reference to FIG. 26, there is provided an exemplary apparatus 2600 that may be configured as output device and player for immersive stereographic (VR or AR) content or as a processor or similar device for use within a VR or AR output and player device. As depicted, the apparatus 2600 may include functional blocks that can represent functions implemented by a processor, software, or combination thereof (e.g., firmware). The apparatus 2600 may include a processor 2610, a memory 2616 coupled to the processor, a sensor 2614 and a VR or AR display device 2615 coupled to the processor, wherein the memory holds instructions that when executed by the processor, cause the apparatus to perform the operations of method 2400 herein above, and optionally, related operations. In related embodiments, a non-transitory computer-readable medium may be encoded with instructions that when executed by the processor 2610, cause an immersive steregraphic (ISG) device to perform the operations of method 2400 herein above, and optionally, related operations.

As illustrated in FIG. 26, the apparatus 2600 may comprise an electrical component 2602 for playing a prerecorded immersive stereographic (VR or AR) video work. The component 2602 may include a means for said playing. Said means may include the processor 2610 coupled to the memory 2616 and to a sensor 2614 and VR or AR display of an immersive VR or AR output apparatus as described herein, the processor executing an algorithm based on program instructions stored in the memory. Such algorithm may include a sequence of more detailed operations, for example, receiving a video stream from a framespace server, and providing user input information from sensors to the server for modifying a framespace path in response to user motions.

The apparatus 2600 may further include an electrical component 2604 for receiving, during the playing, user input indicating an interest in an object appearing in a display of the immersive VR or AR content display apparatus. The component 2604 may include a means for receiving the user input indicating the interest as described. Said means may include the processor 2610 coupled to the memory 2616, the processor executing an algorithm based on program instructions stored in the memory and saving resulting data in the memory. Such algorithm may include a sequence of more detailed operations, for example, processing sensor data indicating at least one of a gaze direction or an intended a view direction of a user of the immersive VR or AR content display apparatus or receiving input from a pointing device manually operated by the user.

The apparatus 2600 may further include an electrical component 2606 for identifying at least one of a three-dimensional model or a rendered image of the three-dimensional model from a computer memory, based on an identity of the object. The component 2606 may include a means for the identifying as described. Said means may include the processor 2610 coupled to the memory 2616, the processor executing an algorithm based on program instructions stored in the memory and saving resulting data in the memory. Such algorithm may include a sequence of more detailed operations, for example, determining an object identifier, providing the object identifier to a database module, and obtaining electronic data defining a three-dimensional model of a corresponding object from the database module.

The apparatus 2600 may further include an electrical component 2608 for combining a rendered image of the three-dimensional model with video data of the prerecorded VR or AR video work, wherein the rendered image replaces an image of the object. The component 2608 may include a means for said combining as described. Said means may include the processor 2610 coupled to the memory 2616, the processor executing an algorithm based on program instructions stored in the memory and saving resulting data in the memory. Such algorithm may include a sequence of more detailed operations, for example, positioning and scaling the object based on a frame identifier, selecting rendering parameters based on the frame identifier, rendering one or more frames using the rendering parameters, and combining a rendering of the frame with a corresponding recorded frame using a computer graphics image combination operation.

With reference to FIG. 26, the apparatus 2600 may optionally include a processor module 2610 having at least one processor, in the case of the apparatus 2600 configured as a data processor. The processor 2610, in such case, may be in operative communication with the modules 2602-2608 via a bus 2612 or similar communication coupling. The processor 2610 may effect initiation and scheduling of the processes or functions performed by electrical components 2602-2606.

In related aspects, the apparatus 2600 may include a sensor module 2614 for sensing user movements or biometric information, and a VR or AR display module 2615. In further related aspects, the apparatus 2600 may optionally include a module for storing information, such as, for example, a memory device/module 2616. The computer readable medium or the memory module 2616 may be operatively coupled to the other components of the apparatus 2600 via the bus 2612 or the like. The memory module 2616 may be adapted to store computer readable instructions and data for execution of the processes and behavior of the modules 2602-2608, and subcomponents thereof, or the processor 2610, or the method 2400 and one or more of the additional operations disclosed herein. The memory module 2616 may retain instructions for executing functions associated with the modules 2602-2608. While shown as being external to the memory 2616, it is to be understood that the modules 2602-2608 can exist within the memory 2616.

Figure 27:
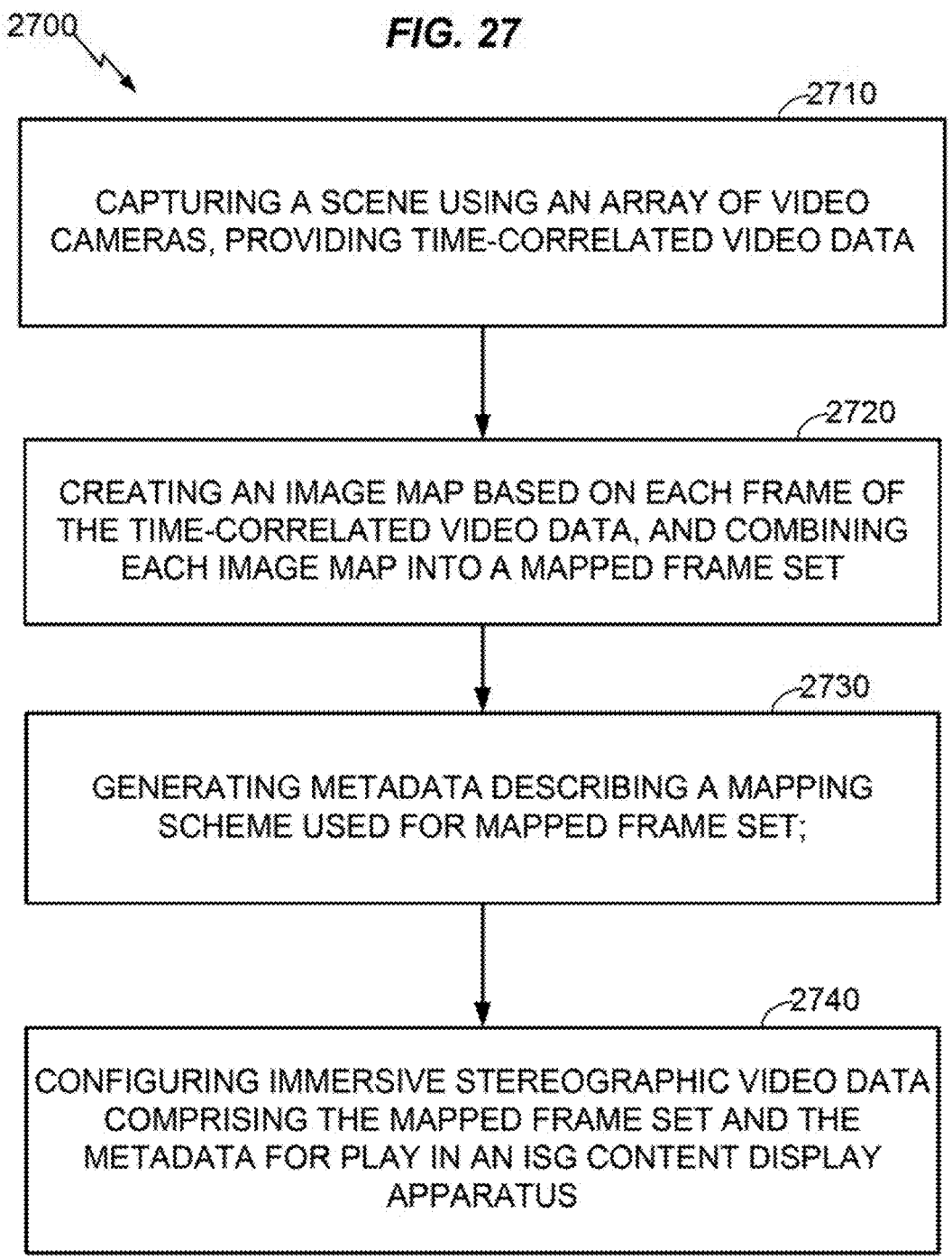
FIG. 27 is a flow chart illustrating operations or aspects of a method for producing VR data using image mapping.

In some embodiments, visual data captured by different cameras that might otherwise be treated as an independent video stream of a framespace may be mapped to form a combined image, for example a 360 degree half-hemisphere, for focus on sections later, at rendering. This may facilitate faster response to user panning and yawing of the view orientation. The undelaying concept is that data for multiple viewpoints are loaded all at once and are singled out for full-screen attention at particular moments of a VR or AR user experience. FIG. 27 indicates a method 2700 for producing video content for output by an immersive VR or AR content display apparatus, based on this concept.

The method 2700 may include, at 2710, capturing a scene using an array of video cameras providing time-correlated video data. The camera array may be a close-packed planar array, for example. The method 2700 may further include, at 2720, creating an image map based on each frame of the time-correlated video data, and combining each image map into a mapped frame set. Creating the image map may include projecting a combination of each frame of the time-correlated video data into at least a portion of a spherical map. In the alternative, or in addition, creating the image map may include creating the image map comprising defining separate tracks of combined image data.

The method 2700 may further include, at 2730, generating metadata describing a mapping scheme used for the mapped frame set. The method 2700 may further include, at 2740, configuring immersive VR or AR video data comprising the mapped frame set and the metadata for play in an immersive content display apparatus.

Figure 28:
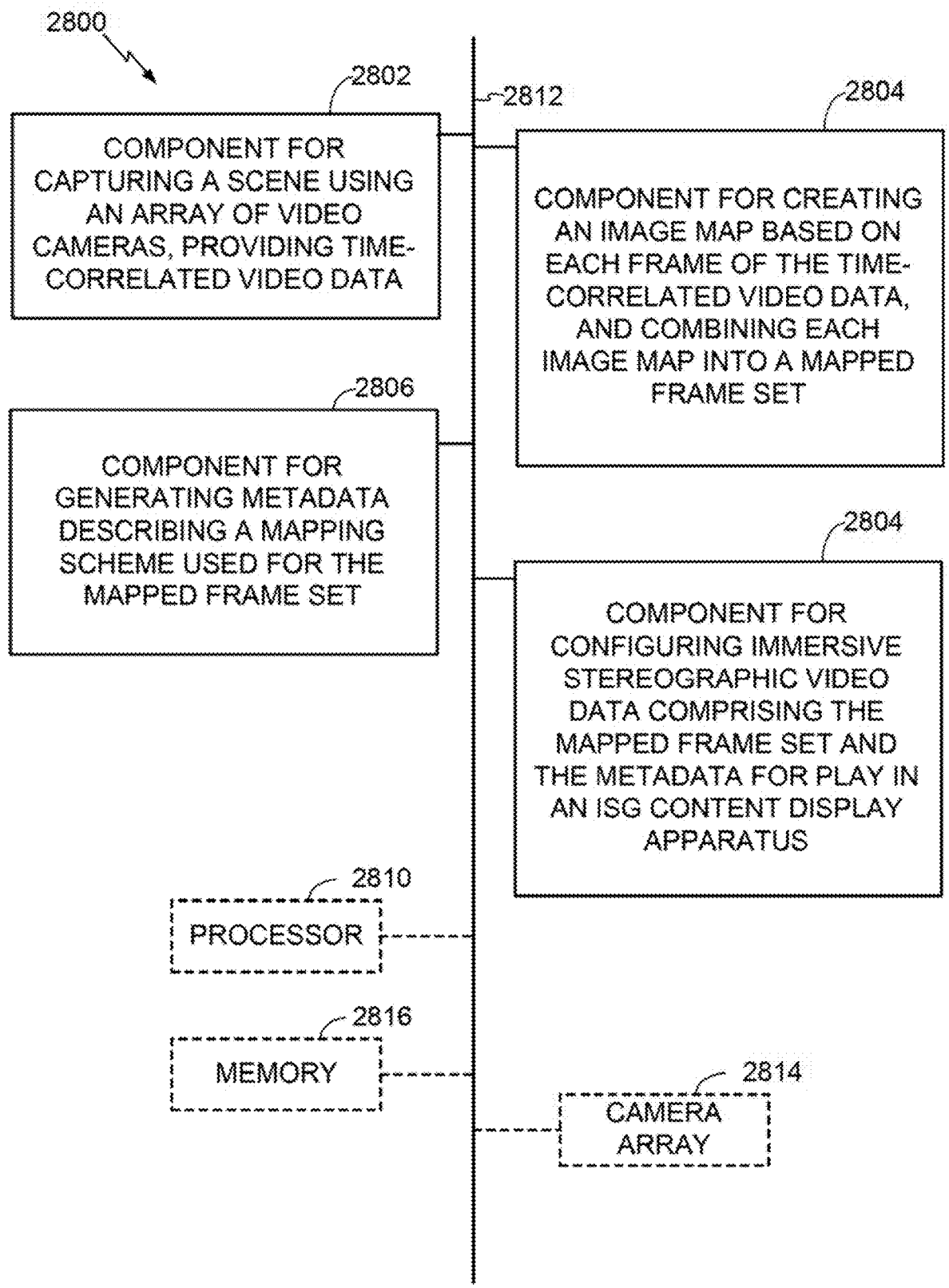
FIG. 28 is a block diagram illustrating components of an apparatus for performing the method of FIG. 27.

With reference to FIG. 28, there is provided an exemplary apparatus 2800 that may be configured as a server for capturing and configuring immersive stereographic (VR or AR) content or as a processor or similar device for use within the server or system. As depicted, the apparatus 2800 may include functional blocks that can represent functions implemented by a processor, software, or combination thereof (e.g., firmware). The apparatus 2800 may include a processor 2810, a memory 2816 coupled to the processor, and a camera array 2814 coupled to the processor, wherein the memory holds instructions that when executed by the processor, cause the apparatus to perform the operations of method 2700 herein above, and optionally, related operations. In related embodiments, a non-transitory computer-readable medium may be encoded with instructions that when executed by the processor 2810, cause an immersive stereographic device to perform the operations of method 2700 herein above, and optionally, related operations.

As illustrated in FIG. 28, the apparatus 2800 may comprise an electrical component 2802 for capturing a scene using an array of video cameras, providing time-correlated video data. The component 2802 may include a means for capturing, for example, scenes from any of the camera arrays as shown or described herein. Said means may include the processor 2810 coupled to the memory 2816 and to the camera array 2814, the processor executing an algorithm based on program instructions stored in the memory. Such algorithm may include a sequence of more detailed operations, for example, correlating video streams from multiple cameras in an array.

The apparatus 2800 may further include an electrical component 2804 for creating an image map based on each frame of the time-correlated video data and combining each image map into a mapped frame set. The component 2804 may include a means for creating an image map based on each frame of the time-correlated video data and combining each image map into a mapped frame set. Said means may include the processor 2810 coupled to the memory 2816, the processor executing an algorithm based on program instructions stored in the memory and saving resulting data in the memory. Such algorithm may include a sequence of more detailed operations, for example, projecting a combination of each frame of the time-correlated video data into at least a portion of a spherical map, or creating the image map comprising defining separate tracks of combined image data.

The apparatus 2800 may further include an electrical component 2806 for generating metadata describing a mapping scheme used for the mapped frame set. The component 2806 may include a means for generating the metadata as described. Said means may include the processor 2810 coupled to the memory 2816, the processor executing an algorithm based on program instructions stored in the memory and saving resulting data in the memory. Such algorithm may include a sequence of more detailed operations, for example, generating a data table as shown in FIG. 5E and described herein above.

The apparatus 2800 may further include an electrical component 2808 for configuring immersive VR or AR video data comprising the mapped frame set and the metadata for play in an immersive content display apparatus. The component 2806 may include a means for said configuring. Said means may include the processor 2810 coupled to the memory 2816, the processor executing an algorithm based on program instructions stored in the memory and saving resulting data in the memory. Such algorithm may include a sequence of more detailed operations, for example, as described above in connection with FIG. 10.

With reference to FIG. 28, the apparatus 2800 may optionally include a processor module 2810 having at least one processor, in the case of the apparatus 2800 configured as an image processor. The processor 2810, in such case, may be in operative communication with the modules 2802-2808 via a bus 2812 or similar communication coupling. The processor 2810 may effect initiation and scheduling of the processes or functions performed by electrical components 2802-2808.

In related aspects, the apparatus 2800 may include a camera array module 2814 operable for receiving video data from a set of cameras aimed at a scene in a geometrically defined arrangement, as described in more detail herein above. In further related aspects, the apparatus 2800 may optionally include a module for storing information, such as, for example, a memory device/module 2816. The computer readable medium or the memory module 2816 may be operatively coupled to the other components of the apparatus 2800 via the bus 2812 or the like. The memory module 2816 may be adapted to store computer readable instructions and data for executing the processes and behavior of the modules 2802-2808, and subcomponents thereof, or the processor 2810, or the method 2700 and one or more of the additional operations disclosed herein. The memory module 2816 may retain instructions for executing functions associated with the modules 2802-2808. While shown as being external to the memory 2816, it is to be understood that the modules 2802-2808 can exist within the memory 2816.

Figure 29:
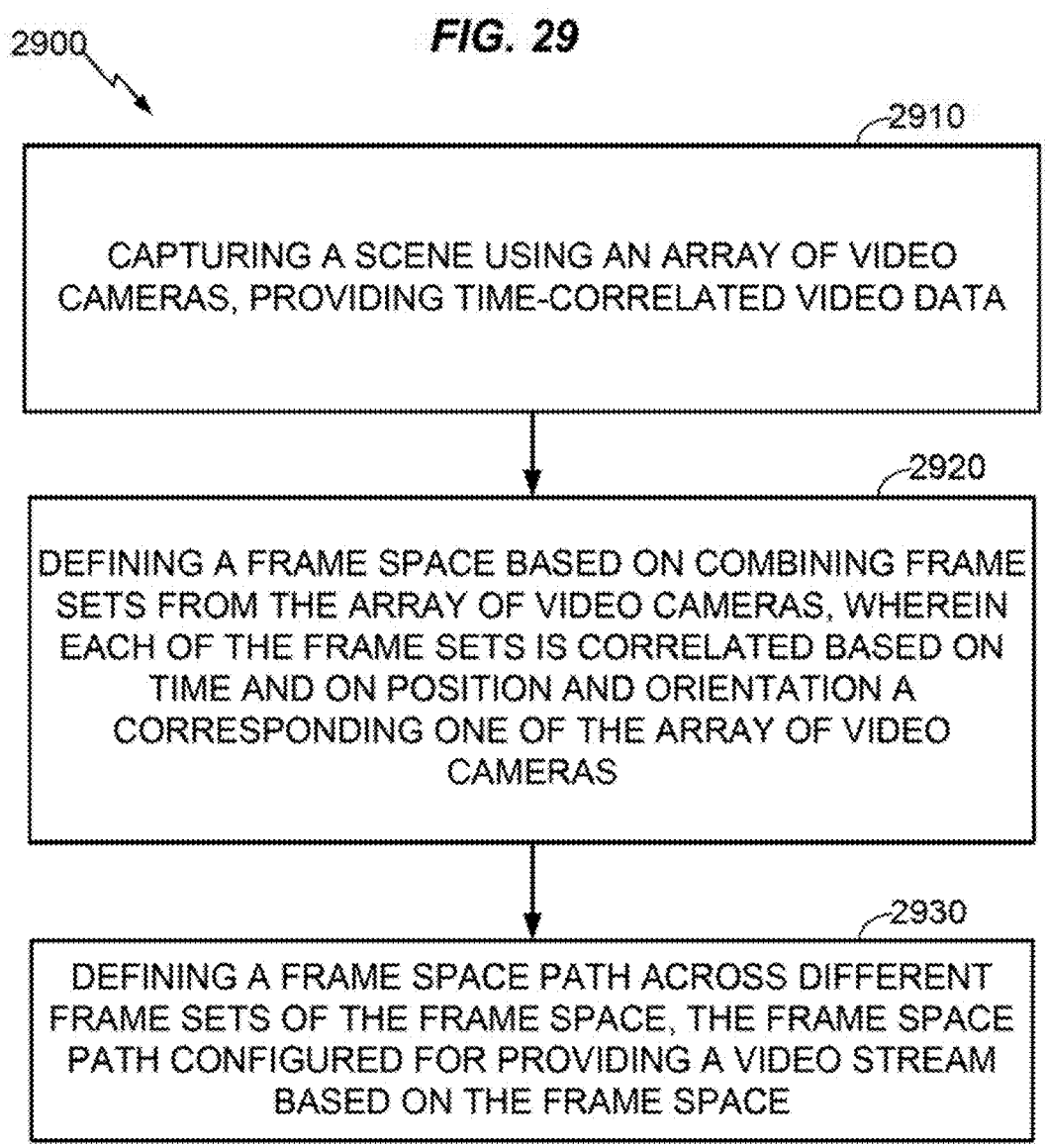
FIGS. 29-30 are flow charts illustrating operations or aspects of method(s) for framespace and framespace path definition for producing immersive VR content.

Similarly, referring to FIG. 29, a method 2900 for producing video content for output by an immersive VR or AR content display apparatus may include an operation comprising, at 2910, capturing a scene using an array of video cameras, providing time-correlated video data. The method 2900 may further include, at 2920, defining a framespace based on combining frame sets from the array of video cameras, wherein each of the frame sets is correlated based on time and on the position and orientation of a corresponding one of the array of video cameras. The method 2900 may further include, at 2930 defining a framespace path across different frame sets of the framespace, the framespace path configured for providing a video stream based on the framespace. These operations are described herein above in connection with FIGS. 5A-6, and elsewhere herein.

Figure 30:
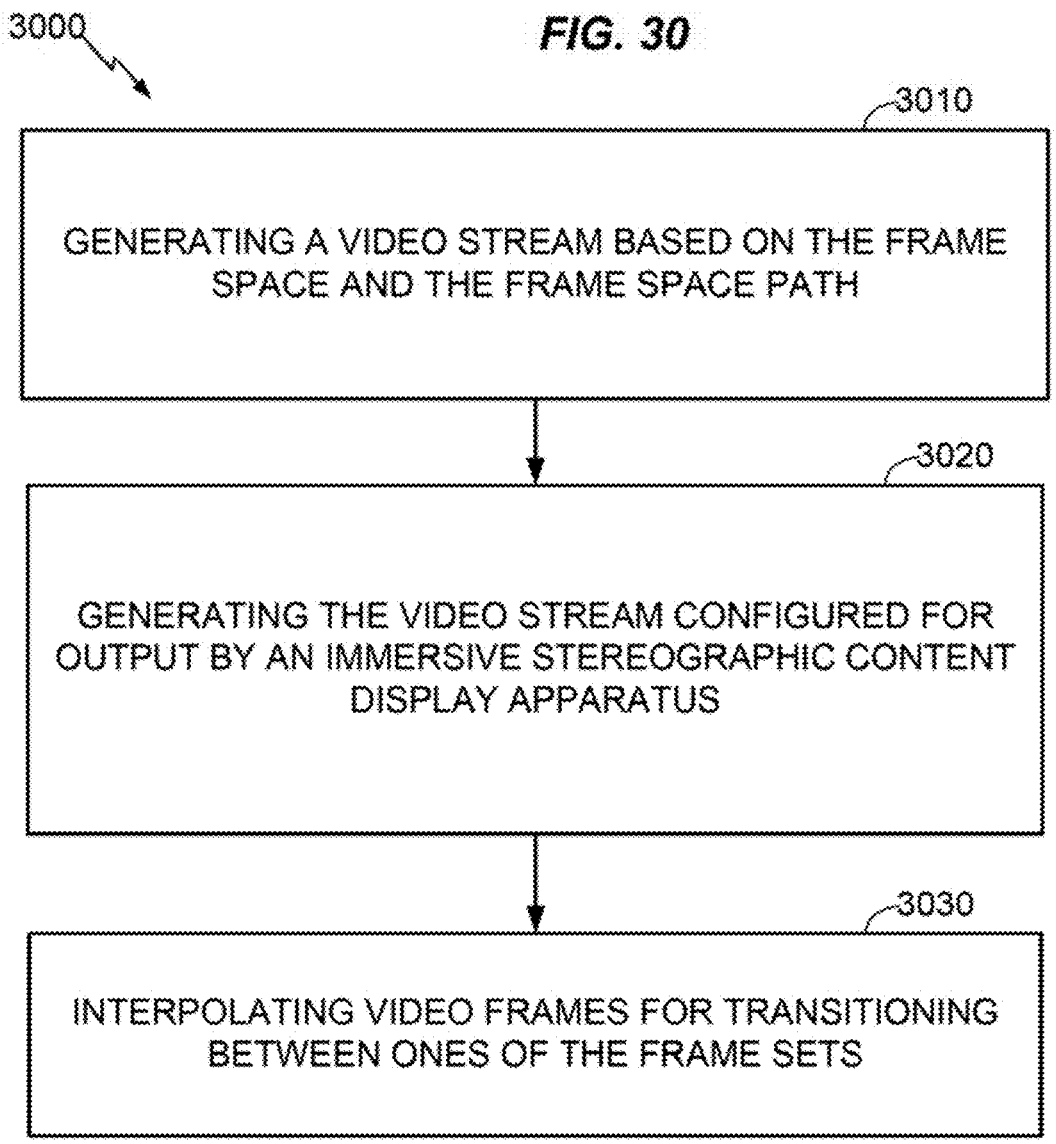

FIG. 30 shows further optional operations 3000 that may be included in method 2900. The method 2900 may further include, at 3010, generating a video stream based on the framespace and the framespace path. The method may further include, at 3020, generating the video stream configured for output by an immersive virtual reality or augmented reality content display apparatus. The method may further include, at 3030, interpolating video frames for transitioning between ones of the frame sets.

Figure 31:
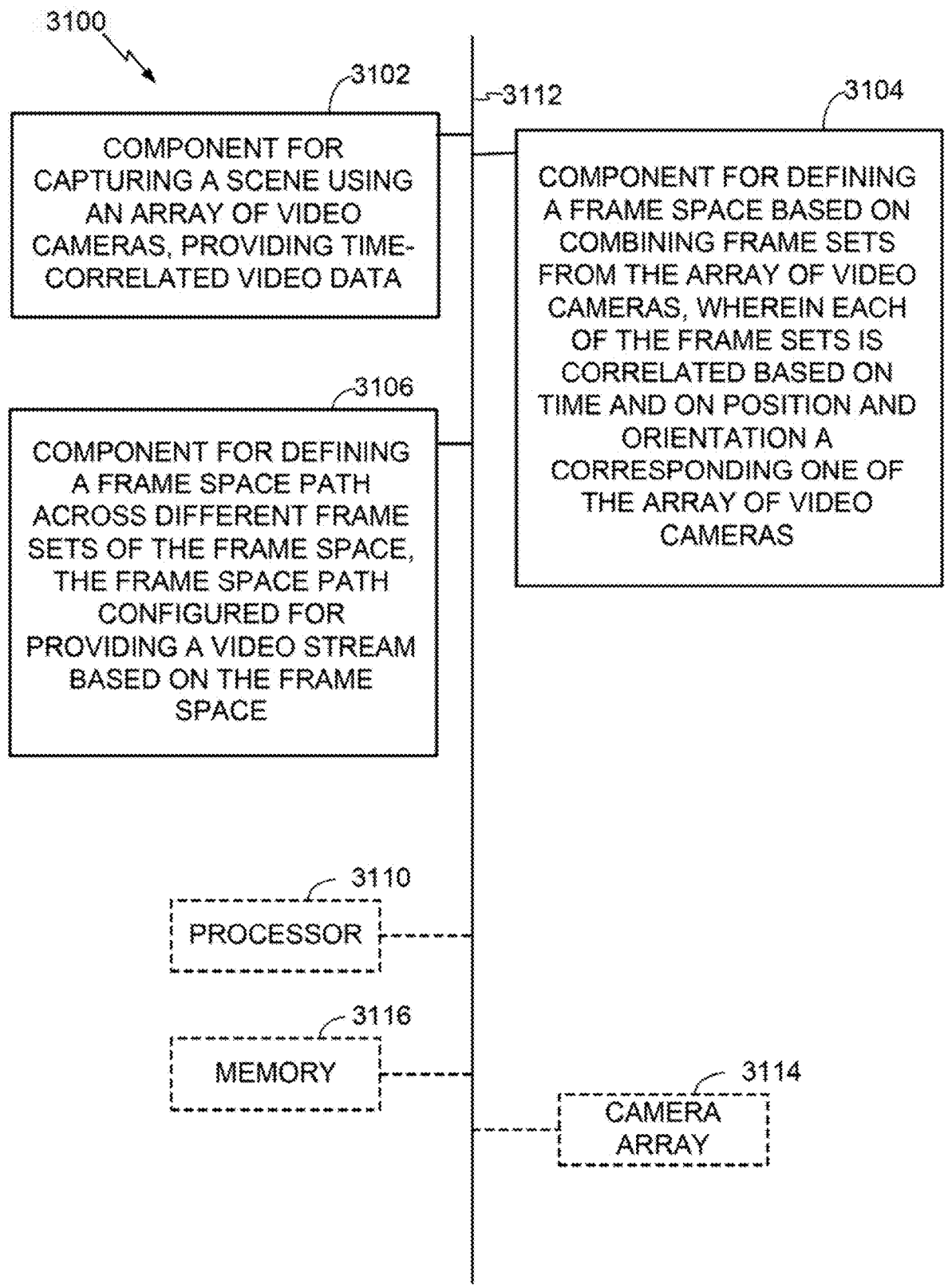
FIG. 31 is a block diagram illustrating components of an apparatus for performing the method(s) of FIGS. 29-30.

With reference to FIG. 31, there is provided an exemplary apparatus 3100 that may be configured as a server or system for producing immersive stereographic (VR or AR) content or as a processor or similar device for use within the server or system. As depicted, the apparatus 3100 may include functional blocks that can represent functions implemented by a processor, software, or combination thereof (e.g., firmware). The apparatus 3100 may include a processor 3110, a memory 3116 coupled to the processor, a sensor and a camera array 3114 coupled to the processor, wherein the memory holds instructions that when executed by the processor, cause the apparatus to perform the operations of method 2900 herein above, and optionally, one or more of the additional operations 3000, and related operations. In related embodiments, a non-transitory computer-readable medium may be encoded with instructions that when executed by the processor 3110, cause an immersive VR or AR device to perform the operations of method 2900 herein above, and optionally, one or more of the additional operations 3000, and related operations.

As illustrated in FIG. 31, the apparatus 3100 may comprise an electrical component 3102 for capturing a scene using an array of video cameras, providing time-correlated video data. The component 3102 may include a means for said capturing as described, for example, any of the camera arrays as shown or described herein. Said means may include processor 3110 coupled to the memory 3116 and to the camera array 3114, the processor executing an algorithm based on program instructions stored in the memory. Such algorithm may include a sequence of more detailed operations, for example, correlating video streams from multiple cameras in an array.

The apparatus 3100 may further include an electrical component 3104 for defining a framespace based on combining frame sets from the array of video cameras, wherein each of the frame sets is correlated based on time and on the position and orientation of a corresponding one of the array of video cameras. The component 3102 may include a means for said defining as described. Said means may include the processor 3110 coupled to the memory 3116, the processor executing an algorithm based on program instructions stored in the memory and saving resulting data in the memory. Such algorithm may include a sequence of more detailed operations, for example, assigning geometric and other metadata to each received frame, and storing the video data in a data structure in association with the geometrical metadata.

The apparatus 3100 may further include an electrical component 3106 for defining a framespace path across different frame sets of the framespace, the framespace path configured for providing a video stream based on the framespace. The component 3102 may include a means for defining the framespace path as described. Said means may include the processor 3110 coupled to the memory 3116, the processor executing an algorithm based on program instructions stored in the memory and saving resulting data in the memory. Such algorithm may include a sequence of more detailed operations, for example, for each frame of a video sequence, selecting a frame or interpolated frame in a time-ordered sequence from the framespace, wherein the selecting preserves view continuity as shown and described above in connection with FIGS. 5A-6.

With reference to FIG. 31, the apparatus 3100 may optionally include a processor module 3110 having at least one processor, in the case of the apparatus 3100 configured as an image processor. The processor 3110, in such case, may be in operative communication with the modules 3102-3106 via a bus 3112 or similar communication coupling. The processor 3110 may effect initiation and scheduling of the processes or functions performed by electrical components 3102-3106.

In related aspects, the apparatus 3100 may include a camera array 3114 operable for receiving video data from a set of cameras aimed at a scene in a geometrically defined arrangement, as described in more detail herein above. In further related aspects, the apparatus 3100 may optionally include a module for storing information, such as, for example, a memory device/module 3116. The computer readable medium or the memory module 3116 may be operatively coupled to the other components of the apparatus 3100 via the bus 3112 or the like. The memory module 3116 may be adapted to store computer readable instructions and data for executing the processes and behavior of the modules 3102-3106, and subcomponents thereof, or the processor 3110, or the method 2900 and one or more of the additional operations 3000 disclosed herein. The memory module 3116 may retain instructions for executing functions associated with the modules 3102-3106. While shown as being external to the memory 3116, it is to be understood that the modules 3102-3106 can exist within the memory 3116.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, tape, magnetic strips . . . ), optical disks (e.g., compact disk (CD), digital versatile disk (DVD), Blu-ray™ discs . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal, also called a "client device." In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring executable instructions for such methodologies to computers.

The invention claimed is:

1. A method for controlling a story line of immersive stereographic content, the method comprising:
    collecting, in a computer memory, sensor data from a plurality of immersive stereographic client devices indicating at least one user biometric during performance of a prerecorded stereographic video work playing on the immersive stereographic client devices;
    correlating, by at least one computer processor, the sensor data to ones of segment identifiers recorded in a data structure, each of the segment identifiers correlated to a different one of prerecorded immersive stereographic video segments comprising the prerecorded immersive stereographic video work;
    determining a region of high audience interest based on the sensor data from the plurality of immersive stereographic client devices while in use by a corresponding plurality of different users and increasing rendering resources allocated to the region based on a measure of the audience interest; and
    defining, by the at least one computer processor, an alternative story line in the form of an electronic data file for a modified version of the prerecorded immersive stereographic video, based on the correlating and on a library of immersive stereographic video segments each associated with an alternative story line branch.

2. The method of claim 1, further comprising selecting the at least one user body metric from the group consisting of: a user head orientation, a user eye orientation, or a user eye surface shape.

3. The method of claim 1, further comprising selecting the at least one user body metric from the group consisting of: heart rate or skin temperature.

4. The method of claim 1, further comprising distributing the prerecorded immersive stereographic video work as part of a real-time rendered application package, wherein playing of the prerecorded video work is triggered by a user-controllable event defined by the rendered application.

5. The method of claim 4, further comprising altering an amount or timing that the prerecorded immersive stereographic video work is played relative to the real-time rendered application package, based on the sensor data.

6. The method of claim 1, further comprising storing a series of versions of the prerecorded immersive stereographic video work in an electronic data storage component, wherein each of the versions is based on a different set of the sensor data.

7. The method of claim 1, further comprising determining, during the performance, a virtual position of a region of visual focus of the at least one user in a virtual environment defined by the immersive stereographic video work, based on the sensor data; and
    controlling output of the apparatus in response to the determining.

8. The method of claim 7, wherein the controlling output comprises adjusting at least one of a depth of focus of the region of visual focus or an apparent focal length on a display of the immersive stereographic content display apparatus, based on the sensor data indicating that the region of visual focus exists.

9. The method of claim 8, wherein adjusting at least one of the depth of focus or apparent focal length comprises shifting a focus point from an original depth towards a foreground object, holding the focus point on the foreground object for a period of time, and then shifting the focus point to a predetermined depth.

10. The method of claim 8, wherein adjusting at least one of the depth of focus or apparent focal length comprises shifting a focus point from an original depth towards a background object, holding the focus point on the background object for a period of time, and then shifting the focus point to a predetermined depth.

11. The method of claim 7, wherein determining the virtual position of the region of visual focus comprises processing the sensor data indicating at least one of a user head orientation, a user eye orientation, or a user eye surface shape.

12. The method of claim 11, further comprising receiving the sensor data from the sensor comprising at least one of: an image sensor, an accelerometer, an interferometer, or a microphone.

13. The method of claim 7, wherein the determining the virtual position of the region of visual focus comprises sensing that the user is viewing a limited portion of the display for a qualifying period, based on the sensor data.

14. The method of claim 7, wherein controlling the output comprises selecting a video segment for the alternative story line.

15. The method of claim 7, wherein controlling the output comprises driving an audio transducer with a signal that produces a directional cue indicating a direction of interest for the at least one user, wherein the directional cue is selected from the group consisting of spoken language or a sound field configured to be perceived as originating from a location of the virtual environment.

16. An apparatus comprising at least one processor operatively coupled to a memory, the memory holding program instructions that when executed by the at least one processor, cause the apparatus to perform:

collecting sensor data from a plurality of immersive stereographic client devices indicating at least one user biometric during performance of a prerecorded stereographic video work playing on the immersive stereographic client devices;

correlating the sensor data to ones of segment identifiers recorded in a data structure, each of the segment identifiers correlated to a different one of prerecorded immersive stereographic video segments comprising the prerecorded immersive stereographic video work;

determining a region of high audience interest based on the sensor data from the plurality of immersive stereographic client devices while in use by a corresponding plurality of different users and increasing rendering resources allocated to the region based on a measure of the audience interest; and defining an alternative story line in the form of an electronic data file for a modified version of the prerecorded immersive stereographic video, based on the correlating and on a library of immersive stereographic video segments each associated with an alternative story line branch.

17. The apparatus of claim 16, wherein the memory holds further instructions for selecting the at least one user body metric from the group consisting of:

a user head orientation, a user eye orientation, or a user eye surface shape.

18. The apparatus of claim 16, wherein the memory holds further instructions for selecting the at least one user body metric from the group consisting of:

heart rate or skin temperature.

19. The apparatus of claim 16, wherein the memory holds further instructions for storing a series of versions of the prerecorded immersive stereographic video work in an electronic data storage component, wherein each of the versions is based on a different set of the sensor data.

20. The apparatus of claim 16, wherein the memory holds further instructions for altering an amount or timing that the prerecorded immersive stereographic video work is played relative to the real-time rendered application package, based on the sensor data.

* * * * *